US012495133B2

(12) United States Patent
Richter et al.

(10) Patent No.: US 12,495,133 B2
(45) Date of Patent: Dec. 9, 2025

(54) MONO TO STEREO IMAGE CONVERSION AND ADJUSTMENT FOR VIEWING ON A SPATIAL COMPUTER

(71) Applicant: Apple Inc., Cupertino, CA (US)

(72) Inventors: Stephan R Richter, Neubiberg (DE); Amaël Delaunoy, Bellevue, WA (US); Keming Cao, San Diego, CA (US); Ozgur Oyman, Palo Alto, CA (US); Tobias Rick, Mountain View, CA (US); Vladlen Koltun, Jackson, WY (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 19/016,117

(22) Filed: Jan. 10, 2025

(65) Prior Publication Data

US 2025/0247513 A1     Jul. 31, 2025

Related U.S. Application Data

(60) Provisional application No. 63/676,966, filed on Jul. 30, 2024, provisional application No. 63/625,490, filed on Jan. 26, 2024.

(51) Int. Cl.
*H04N 13/261* (2018.01)
*H04N 13/00* (2018.01)
(Continued)

(52) U.S. Cl.
CPC ......... *H04N 13/261* (2018.05); *H04N 13/111* (2018.05); *H04N 13/332* (2018.05); *H04N 2013/0081* (2013.01)

(58) Field of Classification Search
CPC .. H04N 13/261; H04N 13/111; H04N 13/332; H04N 2013/0081
See application file for complete search history.

(56) References Cited

U.S. PATENT DOCUMENTS

| 8,488,868 B2 * | 7/2013 | Tam ...................... H04N 13/257 348/44 |
|---|---|---|
| 9,020,241 B2 | 4/2015 | Leichsenring et al. |

(Continued)

FOREIGN PATENT DOCUMENTS

| CN | 101593349 A | 6/2012 |
|---|---|---|
| CN | 102360489 B | 7/2013 |

(Continued)

*Primary Examiner* — Francis Geroleo
(74) *Attorney, Agent, or Firm* — Thompson Hine LLP

(57) ABSTRACT

Various implementations disclosed herein include devices, systems, and methods that convert a mono image to a stereo image pair. For example, a process may obtain an input image including appearance values at pixel positions. The input image corresponds to an appearance of a scene from a first viewpoint. The process may further determine a depth image comprising depth values at original pixel positions that are mapped to corresponding pixel positions of the input image. The process may further generate a first output image corresponding to a second viewpoint of the scene different than the first viewpoint and a second output image corresponding to a third viewpoint of the scene different than the second viewpoint. The process may further enable comfort-based 3D style presets for adjusting comfort parameters for viewing a stereo image pair.

12 Claims, 16 Drawing Sheets

(51) Int. Cl.
*H04N 13/111* (2018.01)
*H04N 13/332* (2018.01)

(56) References Cited

U.S. PATENT DOCUMENTS

| | | |
|---|---|---|
| 9,342,914 B2 | 5/2016 | Turner et al. |
| 9,438,878 B2 | 9/2016 | Niebla, Jr. et al. |
| 9,615,082 B2 | 4/2017 | Sandrew et al. |
| 9,736,449 B1 | 8/2017 | Fan |
| 9,934,556 B2 * | 4/2018 | Yen ................ H04N 13/261 |
| 10,096,157 B2 | 10/2018 | Herman |
| 11,257,272 B2 | 2/2022 | Rowell et al. |
| 2007/0024614 A1 * | 2/2007 | Tam ................ H04N 13/282 |
| | | 348/E13.02 |
| 2010/0141757 A1 * | 6/2010 | Baik ................ H04N 13/139 |
| | | 382/106 |
| 2011/0273543 A1 * | 11/2011 | Ushio ................ H04N 13/261 |
| | | 348/54 |
| 2013/0162629 A1 * | 6/2013 | Huang ................ H04N 13/128 |
| | | 345/419 |
| 2015/0213640 A1 * | 7/2015 | Neill ................ H04N 13/156 |
| | | 345/427 |
| 2022/0335638 A1 | 10/2022 | Kar |
| 2023/0239449 A1 * | 7/2023 | Tan ................ G06T 7/13 |
| | | 382/154 |
| 2025/0200771 A1 * | 6/2025 | Jeong ................ G06T 7/50 |

FOREIGN PATENT DOCUMENTS

| | | |
|---|---|---|
| CN | 105608666 A | 5/2016 |
| CN | 118474328 A | 8/2024 |
| EP | 2747427 A1 | 6/2014 |

\* cited by examiner

MONO TO STEREO IMAGE CONVERSION AND ADJUSTMENT FOR VIEWING ON A SPATIAL COMPUTER

CROSS-REFERENCE TO RELATED APPLICATIONS

This Application claims the benefit of U.S. Provisional Application Ser. No. 63/676,966 filed Jul. 30, 2024, and U.S. Provisional Application Ser. No. 63/625,490 filed Jan. 26, 2024, each of which is incorporated herein by reference in its entirety.

TECHNICAL FIELD

The present disclosure generally relates to systems, methods, and devices that convert mono image content to a stereo image pair using viewpoint, depth or boundary adjustment processes in combination with comfort parameter adjustments.

BACKGROUND

Existing techniques for viewing a two-dimensional (2D) image may not adequately facilitate enhancements of such an image with effects that improve the realism or other aspects of the image to provide efficient, desirable, and enhanced viewing experiences.

SUMMARY

Various implementations disclosed herein include devices, systems, and methods that convert a mono image to a stereo image pair using viewpoint-based warping, depth-based warping and/or boundary adjustment processes. The mono image may be converted to a stereo image pair in real time for display via, inter alia, a head mounted device (HMD), etc.

In some implementations, a viewpoint-based warping process is implemented to generate a right eye view-based image and left eye view-based image from an input image associated with a center viewpoint. In some implementations, the input image may correspond to an appearance of a scene with respect to a center viewpoint of a user and may include any type of image such as, inter alia, a photo that includes appearance values (e.g., color values) at pixel positions of the input image. In some implementations, a depth image that includes depth values at original pixel positions mapped to the pixel positions of the input image may be utilized to generate a left eye output image and a right eye output image with respect to left and right eye viewpoints differing from the center viewpoint of the input image. In some implementations, the left eye output image and the right eye output image may be used in combination to form a stereo output image pair that depicts the scene for viewing on a stereoscopic display of a head-mounted device (HMD).

In some implementations, a depth-based warping process is implemented to preserve a resolution (e.g., a high resolution such as, inter alia, 20 megapixels or more, etc.) of the input image. A depth-based warping process may be configured to warp an input image to produce one viewpoint or two viewpoints. For example, a left eye view may be generated from a right eye view and/or a right eye view may be generated from a left eye view. In some implementations, it may be preferable to generate both a right eye view and a left eye view from a center viewpoint.

In some implementations, the depth-based warping process may utilize sparse depth information to warp an input image to a single viewpoint or multiple (e.g., two) viewpoints while preserving a resolution of the input image. For example, sparse depth information may include, inter alia, a low-resolution depth map that comprises a resolution (e.g., 2 megapixels, etc.) that is lower than a resolution (e.g., 20 megapixels, etc.) of the original input image. The sparse depth information is utilized to determine how to warp a coordinate image. For example, the sparse depth information may comprise a low-resolution image that provides a mapping of pixel positions of the low-resolution image to associated pixel positions in the high-resolution input image. Subsequently, the coordinate image may be up-sampled. For example, the coordinate image may be up-sampled by interpolating between pixels to identify intermediate pixel mapping values for intermediate pixels. The up-sampled coordinate image may comprise a same or similar resolution as the original input image and may be used to extract red, green, and blue (RGB) values from pixels of the original input image. Therefore, using an up-sampled coordinate image as a mapping structure may enable details of the original input image to be preserved within an output of the warping process thereby enabling the input image to be used as a lookup table for populating the output image.

In some implementations, a mono image may be converted to a stereo image pair using a boundary adjustment process that may preserve details in areas from an input image that would otherwise appear blended in an output (stereo) image. For example, a foreground portion of an image (e.g., hair or facial features of a person) may be alpha blended with a background portion of the image (e.g., a wall in a room) rather than performing a process for blurring the foreground portion with the background portion. In some implementations, an input image and an estimated depth may be used to classify pixels within boundary regions between local foreground and background regions. The local foreground and background regions may be extended and blended by, e.g., using a matting network to determine blending weights, alpha blending values, etc. For example, in a local boundary region, a first portion/pixel may comprise all local foreground regions such as, inter alia, hair. Likewise, a second portion/pixel may comprise all local background regions such as, inter alia, a wall. Therefore, a third middle transition region (i.e., between the foreground and background regions) may be blended. For example, hair in a local foreground portion may be presented in a partially transparent layer located over a top of a wall (in a background portion) being presented on an underlying opaque layer.

In some implementations, comfort-based three-dimensional (3D) style presets may be implemented for adjusting comfort parameters for viewing stereo 3D content, such as a stereo image pair generated from 2D content via a device such as, inter alia, an HMD. Typical stereo 3D image and video playback implementations may cause visual discomfort due to vergence accommodation conflict and therefore comfort-based 3D style presets may be utilized to address differing content viewing preferences for different users to deliver differing levels of stereo visual comfort and levels of immersion. For example, comfort parameters being adjusted via 3D style presets may include, inter alia, maximum disparity parameters, disparity adjustment parameters, motion parameters, binocular rivalry parameters, vertical disparity parameters, poor image quality parameters, low light parameters, cardboard effect parameters, puppet-theater effect parameters, color/luminance/sharpness mismatch parameters, etc.

In some implementations, maximum disparity parameters may be adjusted via disparity map adjustments. In some implementations, disparity adjustment parameters may be adjusted with respect to target real-world disparities. In some implementations, cardboard effect parameters may include flattened depth planes. In some implementations, puppet-theater effect parameters may be associated with unnatural object sizes and shapes.

In some implementations, an electronic device has a processor (e.g., one or more processors) that executes instructions stored in a non-transitory computer-readable medium to perform a method. The method performs one or more steps or processes. In some implementations, the electronic device obtains an input image comprising appearance values at pixel positions, the input image corresponding to an appearance of a scene from a first viewpoint. Some implementations determine a depth image comprising depth values at original pixel positions that are mapped to at least a subset of the pixel positions of the input image. A coordinate mapping may be used to map the original pixel positions to corresponding pixel positions in the input image. Some implementations generate a first output image corresponding to a second viewpoint of the scene different than the first viewpoint. The first output image is generated by determining a first set of altered pixel positions for the depth values and identifying appearance values for the first set of altered pixel positions based on the coordinate mapping and the input image. Some implementations generate a second output image corresponding to a third viewpoint of the scene different than the second viewpoint. The second output image is generated by determining a second set of altered pixel positions for the depth values and identifying appearance values for the second set of altered pixel positions based on the coordinate mapping and the input image.

In some implementations, an electronic device has a processor (e.g., one or more processors) that executes instructions stored in a non-transitory computer-readable medium to perform a method. The method performs one or more steps or processes. In some implementations, the electronic device obtains an input image depicting a scene. The input image may include pixels and having a first resolution. In some implementations, a depth image may be determined. The depth image may correspond to a subset of the pixels of the input image from a first viewpoint. The depth image may have a second resolution that is less than the first resolution. In some implementations, a coordinate mapping may be generated for that mapping positions in the depth image and positions in the input image. Some implementations may perform a first adjustment to the coordinate mapping to alter the coordinate mapping to correspond to a second viewpoint different than the first viewpoint. Some implementations may perform a second adjustment to the coordinate mapping to increase resolution of the coordinate mapping and an output image corresponding to a view of the scene from the second viewpoint may be provided. The output image may be provided based on the input image and the coordinate mapping.

In some implementations, an electronic device has a processor (e.g., one or more processors) that executes instructions stored in a non-transitory computer-readable medium to perform a method. The method performs one or more steps or processes. In some implementations, the electronic device obtains an input image depicting a scene from a first viewpoint. In response, an output image may be generated based on the input image. The output image may depict the scene from a second viewpoint differing than the first viewpoint. In some implementations, a boundary region of the output image is identified based on depth information. The boundary region includes a first portion associated with only a relatively proximate portion of the scene, a second portion associated with only a relatively distant portion of the scene, and a third portion associated with both the relatively proximate portion and the relatively distant portion of the scene. In some implementations, extended foreground content may be generated by extending foreground content in the first portion into the third portion and extended background content may be generated by extending background content in the second portion into the third portion. In some implementations, the boundary region of the output image may be updated by providing blended content for the third portion using the extended foreground content and extended background content.

In some implementations, an electronic device has a processor (e.g., one or more processors) that executes instructions stored in a non-transitory computer-readable medium to perform a method. The method performs one or more steps or processes. In some implementations, the electronic device obtains an image depicting two-dimensional (2D) content. In some implementations, an adjustment to a 3D tuning parameter is performed. The 3D tuning parameter may be associated with 3D content viewing styles. In some implementations, a 3D stereo image pair corresponding to the image is generated using the 3D tuning parameter and in response a view of a 3D environment including the 3D stereo image pair is presented.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
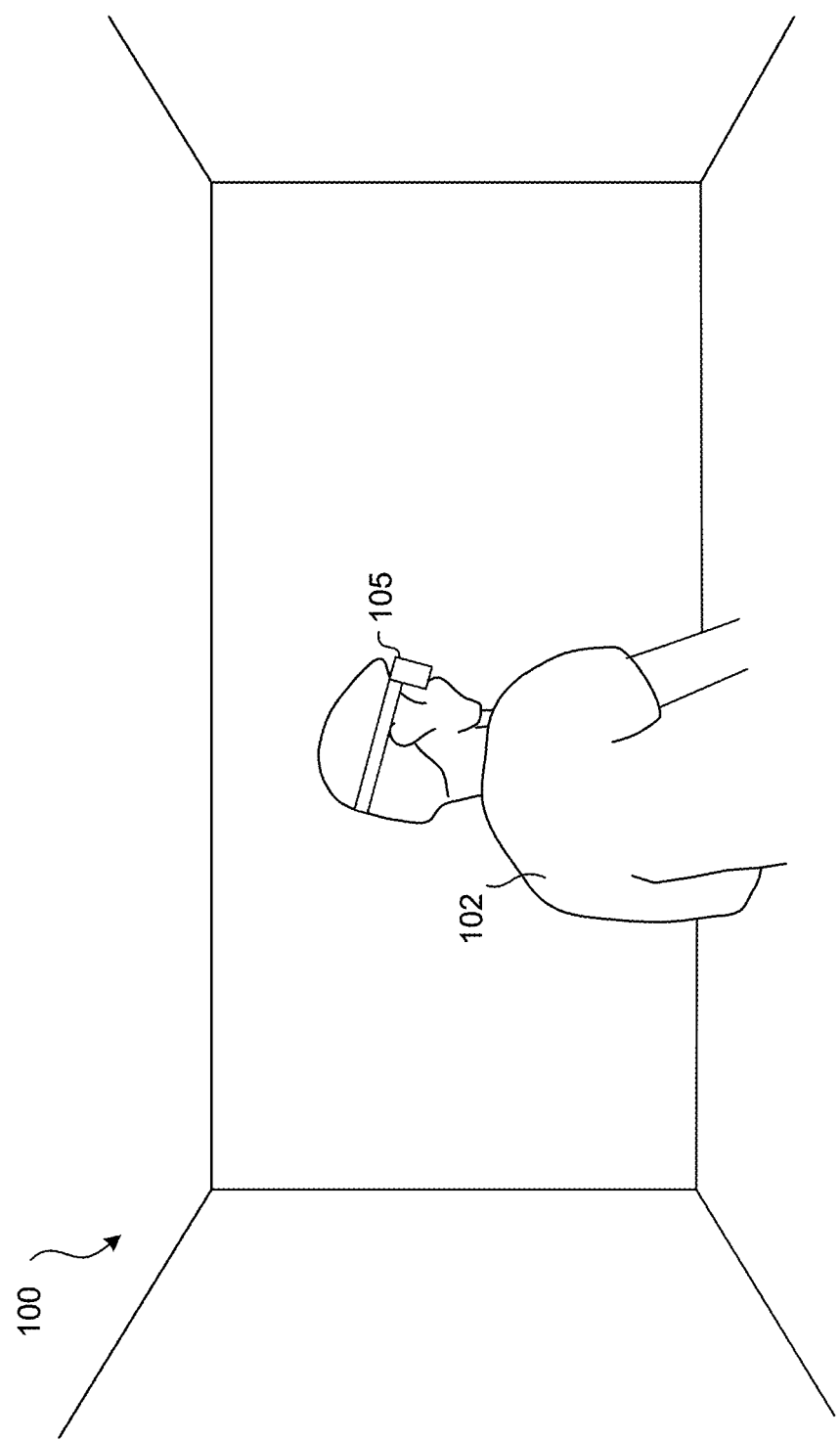
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 105 operating in a physical environment 100. In the example of FIG. 1, the physical environment 100 is a room. The electronic device 105 may include one or more cameras, microphones, depth sensors, or other sensors that can be used to capture information about and evaluate the physical environment 100 and the objects within it, as well as information about the user 102 of electronic device 105. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic device 105 (e.g., a wearable device such as an HMD). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

In some implementations, an HMD (e.g., device 105), communicatively coupled server, or other external device may be configured to convert (e.g., in real time) a mono image (e.g., a photo in a photo library, frames of a video, etc.) into a stereo pair of images that may be viewed via a headset such as, inter alia, an HMD. A mono image may be converted into a stereo pair of images using viewpoint-based warping, depth-based warping and/or boundary adjustment processes.

A viewpoint-based warping process may include obtaining an input image and generating a left eye view image and right eye view image from the input image associated with a center viewpoint of a user. The input image may correspond to an appearance of a scene with respect to a center viewpoint of a user and may include any type of image such as, inter alia, a photo that includes color values at pixel positions of the input image. In some implementations, a depth image may be determined. The depth image may include depth values at original pixel positions (of the input image) mapped to a subset of pixel positions of the input image. The depth image may be utilized to generate a left eye output image and a right eye output image with respect to eye viewpoints (e.g., left and right) differing from the center viewpoint of the input image. In some implementations, the left eye output image and the right eye output image in combination form a stereo output image pair that depicts the scene for viewing on a stereoscopic display of an HMD.

A depth-based warping process may be implemented to preserve a resolution of an input image (e.g., an original mono image) with respect to an output image (e.g., a resulting stereo pair of images). A depth-based warping process may be implemented to warp an input image to produce a viewpoint(s) (e.g., one viewpoint, two viewpoints, etc.). For example, a left eye view may be generated from a right eye view and/or a right eye view may be generated from a left eye view.

In some implementations, the depth-based warping process may utilize depth information to warp an input image to at least one viewpoint. For example, depth information may include, inter alia, a low-resolution (e.g., 2 mega-pixels, etc.) depth map that comprises a resolution that is less than a resolution (e.g., 20 megapixels, etc.) of the original input image. The depth information is utilized to determine a process for warping a coordinate image. For example, the depth information may comprise a low-resolution image providing a mapping of pixel positions of the low resolution image with respect to associated pixel positions in the high resolution input image. Subsequently, the coordinate image is up-sampled by interpolating between pixels to identify intermediate pixel mapping values for intermediate pixels. The up-sampled coordinate image may comprise a similar resolution as the original input image and may be used to extract RBG values from pixels of the original input image. Utilizing an up-sampled coordinate image as a mapping structure enables details of the original input image to be preserved within an output of the warping process thereby enabling the input image to be used as a lookup table for populating output for an output image.

In some implementations, a mono image may be converted to a stereo image pair using a boundary adjustment process that may preserve details from regions of an input image that may otherwise appear blended in an output (stereo) image. For example, a foreground portion of an image (e.g., hair of an animal such as a dog) may be alpha blended with a background portion of the image (e.g., a wall) instead of blurring the foreground portion with the background portion. In some implementations, an input image and an estimated depth may be used to classify pixels within boundary regions between local foreground and background regions. The local foreground and background regions may be extended and blended by, e.g., using a matting network to determine blending weights, alpha blending values, etc. For example, in a local boundary region, a first portion/pixel may comprise all local foreground portions such as, inter alia, hair. Likewise, a second portion/pixel may be comprise all local background portions such as, inter alia, a wall, a ceiling, etc. Therefore, a third/middle portion may be blended. For example, hair in a local foreground portion may be presented in a partially transparent layer located over a top of a wall (in a background portion) being presented on an underlying opaque layer.

In some implementations, stereo 3D image and video playback may cause visual discomfort due to vergence accommodation conflict and therefore a 3D tuning parameter adjustment may be performed with respect to an image or a video (e.g., frames of a video) to address different content viewing preferences of different users such that differentiated levels of stereo visual comfort and associated levels of immersion may be enabled for differing users. For example, an image depicting 2D content (e.g., a photo or video) may be obtained (e.g., via an HMD) and an adjustment to a 3D tuning parameter associated with 3D content viewing styles may be performed such that a 3D stereo image pair corresponding to the image is generated using the 3D tuning parameter thereby enabling a view of a 3D environment including the 3D stereo image pair (i.e., a customized version) to be presented to a user.

In some implementations, the adjustment to the 3D tuning parameter may include modifying a disparity map based on a maximum disparity parameter. The modified disparity map may be used to perform the adjustment to control an amount of perceived depth within the view.

In some implementations, the adjustment to the 3D tuning parameter may include performing a disparity adjustment by modifying a disparity map to match a target real-world disparity. The disparity adjustment may be performed when a maximum disparity parameter exceeds a threshold level.

In some implementations, the adjustment to the 3D tuning parameter may include modifying scene depth characterization formats differing from disparity modifications.

In some implementations, the adjustment to the 3D tuning parameter may include: activating a preset 3D tuning parameter, variably adjusting the 3D tuning parameter, etc.

In some implementations, the adjustment to the 3D tuning parameter may be enabled in response to user input.

In some implementations, the adjustment to the 3D tuning parameter may include modifying a motion parameter within the view.

Figure 2:
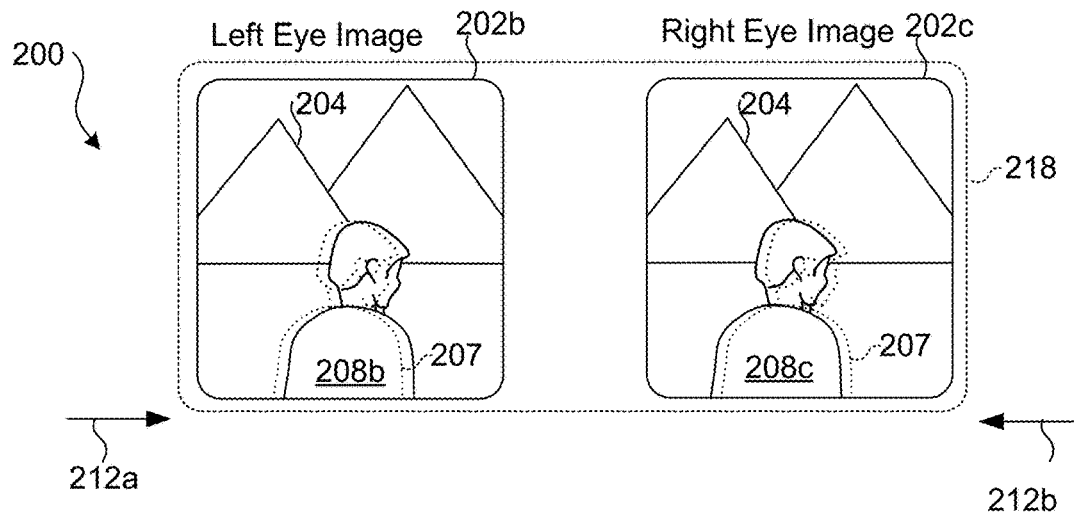
FIG. 2 illustrates an example representing viewpoint-based warping process that converts a mono image to a stereo image pair, in accordance with some implementations.
Figure 2:
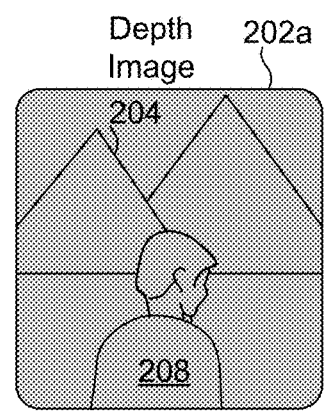
Figure 2:
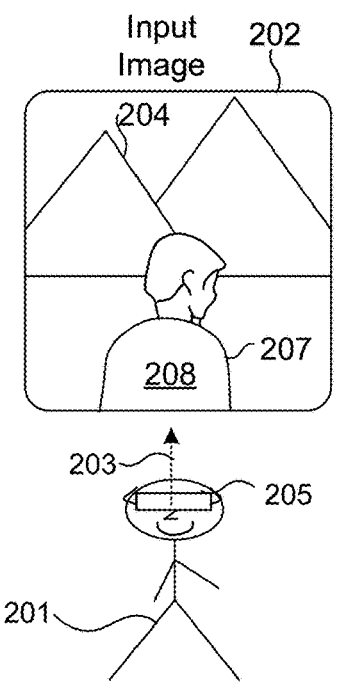

FIG. 2 illustrates an example representing a viewpoint-based warping process 200 that converts a mono image to a stereo image pair by generating a left eye view (output) image 202*b* and right eye view (output) image 202*c* from a (mono) input image 202 associated with a center viewpoint 203 of a user 201 with respect to a device 205 displaying the input image 202, in accordance with some implementations. The input image 202 may comprise, inter alia, a 2D photo (e.g., from a photo library) or screenshot (e.g., from a video game) representing an appearance of a scene comprising a person 208 in a foreground and mountains 204 in a background. The input image 202 may include appearance values such as color values located at pixel positions.

The viewpoint-based warping process 200 may include determining a depth image 202*a* (e.g., a low resolution 3-dimensional (3D) model illustrating person 208 in a foreground and mountains 204 in a background) that includes depth values at original pixel positions that are mapped to a subset of the pixel positions of the input image 202. Depth image 202*a* includes a coordinate mapping to map the original pixel positions to corresponding pixel positions in the input image 202.

Left eye view image 202*b* corresponds to a left eye viewpoint of the scene with respect to input image 202 and may be generated by determining a first set of altered pixel positions for the depth values (for the left eye viewpoint) and identifying appearance (e.g., color) values for the first set of altered pixel positions based on the coordinate mapping (of the depth image 202*a*) and the input image 202. The left eye view image 202*b* represents a warped view 208*b* of the person 208 located at a first position (e.g., shifted horizontally in a direction 212*a*) differing from an original position 207 of the user 208 in the original input image 202.

Right eye view image 202*c* corresponds to a right eye viewpoint of the scene respect to input image 202 and may be generated by determining a second set of altered pixel positions for the depth values (e.g., for the right eye viewpoint) and identifying appearance (e.g., color) values for the second set of altered pixel positions based on the coordinate mapping (of the depth image 202*a*) and the input image 202. The right-eye view image 202*c* represents a warped view 208*c* of the person 208 located at a second position (e.g., shifted horizontally in a direction 212*b*) differing from the original position 207 of the user 208 in the original input image 202. The first position represents the user 208 at a different location within left eye image version 202*a* than the second position within right eye image version 202*b*.

Therefore, when viewed via an HMD, the combination of left eye image version 202*a* and right eye image version 202*b* form a stereo output image pair 218 depicting the scene for viewing on a stereoscopic display of device 205 (e.g., an HMD).

Figure 3:
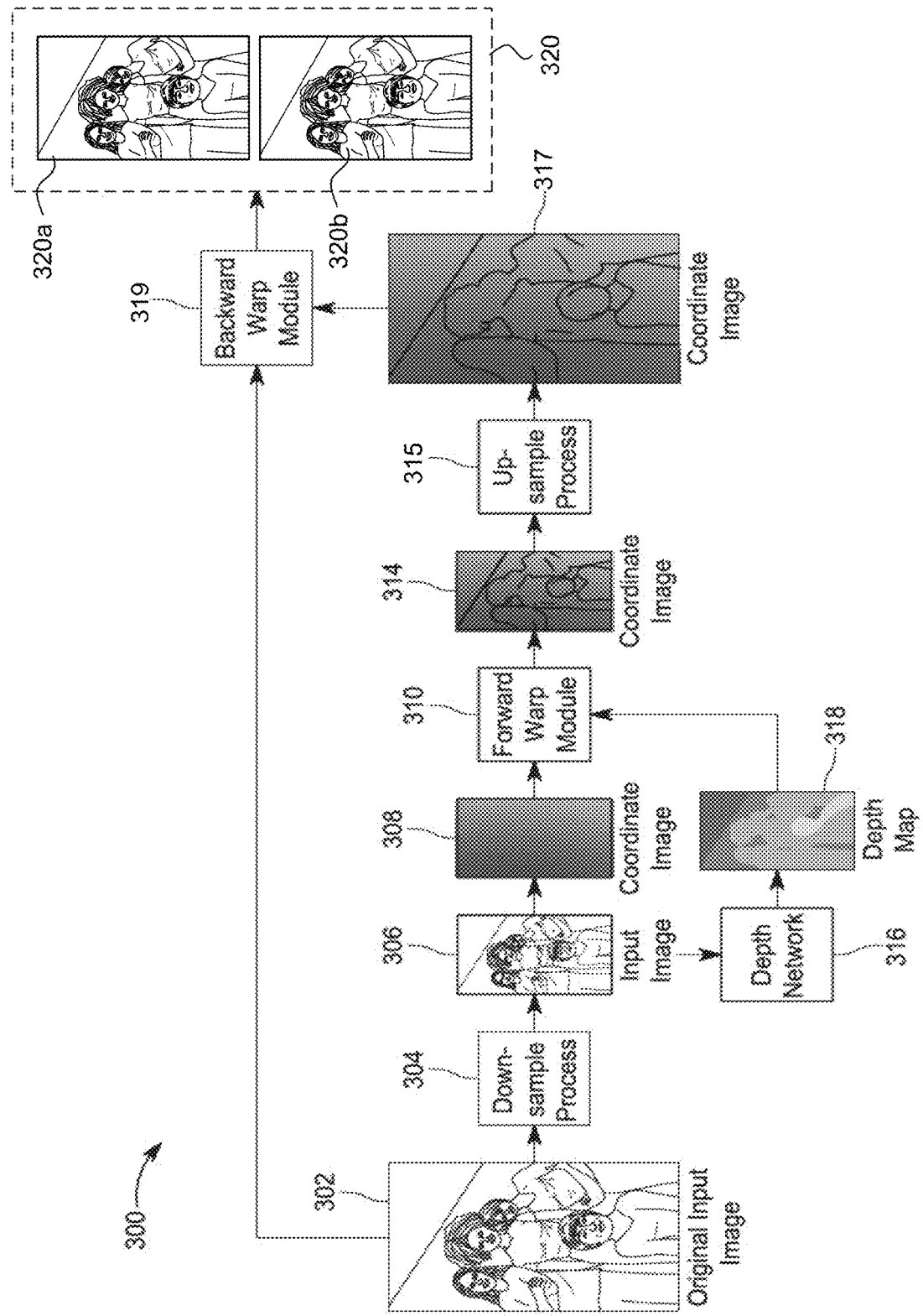
FIG. 3 illustrates a process for converting a mono image to a stereo image pair using a depth-based warping process, in accordance with some implementations.

FIG. 3 illustrates a process 300 for converting a mono image to a stereo image pair using a depth-based warping process that preserves details such as resolution of an original input image 302, in accordance with some implementations. Process 300 includes warping image content based on a depth map 318 and subsequently utilizing coordinate adjustments during an upscaling process to maintain high-frequency details (resolution) from original image 302. For example, process 300 may comprise a viewpoint-based warping process that converts a mono image (e.g., original input image 302) to a stereo image pair (an output image 320) by generating a left eye view image 320a and a right eye view image 320b associated with a viewpoint of a user with respect to a device displaying the original input image.

Process 300 is initiated in response to executing a down sampling process 304 with respect to original input image 302 (e.g., a high-resolution image such as, for example, a 20-megapixel (MP) image) to generate a down sampled input image 306 (e.g., comprising a low resolution such as, for example, 2 MP). Down sampling process 304 may be performed so that a low resolution image (e.g., input image 306) is generated for providing a mapping of pixel positions in the low resolution image to positions in a high resolution input image (e.g., original input image 302) such that when the low resolution image is up-sampled (e.g., by interpolating between pixels to identify intermediate pixel mapping values for intermediate pixels), the up-sampled image may be used to pull RBG values from pixels of an original input image to enable details of the input image to be preserved in the output of process 300.

Subsequently, a depth network 316 is enabled to predict/generate a low-resolution depth map 318, such as for example, 2 MP. Depth map 318 is used to determine how to warp (via forward warp module 310) a coordinate image 308 associated with down sampled input image 306. Coordinate image 308 comprises a low-resolution image providing a mapping of pixel positions in the low-resolution image to pixel positions in the original high resolution input image 302. Subsequently, coordinate image 308 is warped (via warp module 310) into a new perspective view coordinate image(s) 314 (e.g., including a left eye view image and a right eye view image). The warping process includes transforming each pixel's position (of coordinate image 308) based on the depth information of depth map 318 thereby creating new perspective view coordinate image(s) 314.

New perspective view coordinate image(s) 314 is subsequently up-sampled (via an up-sampling process 315) by interpolating values between neighboring pixels to identify intermediate pixel mapping values for intermediate pixels thereby resulting in an up-sampled coordinate image 317 having the same resolution as the original input image 302. Up-sampled coordinate image 317 is used to pull RBG values (via backward warp module 319) from the pixels of the original input image 302 to populate the output image 320 that may include a left eye view image 320a from a first perspective and a right eye view image 320b from a second and differing perspective. Therefore, using a coordinate image that is up-sampled as a mapping enables details of the original input image 302 to be preserved in the output of the warping process thereby enabling the original input image 302 to be used as a lookup table to populate the output image 320.

Figure 4:
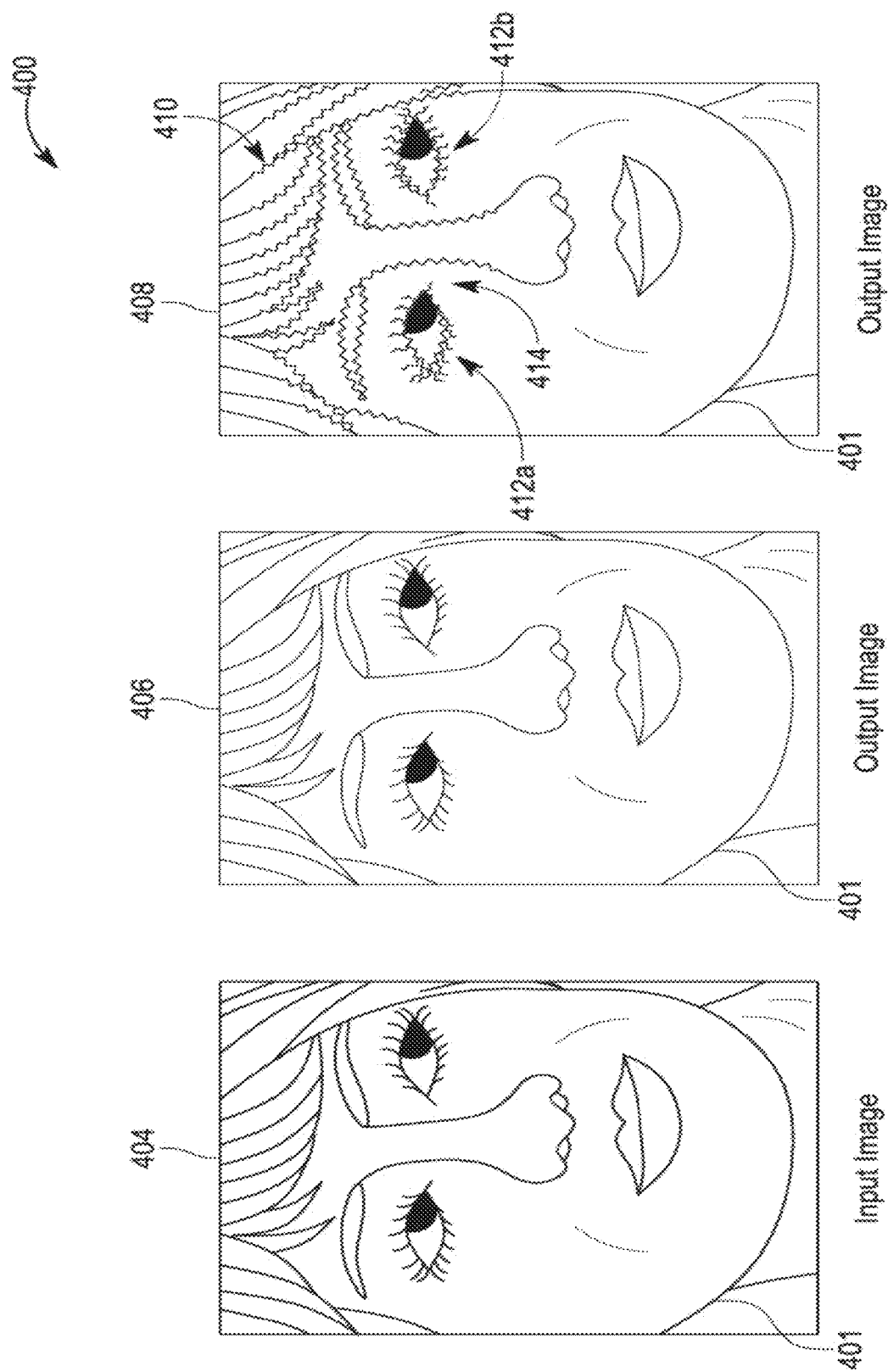
FIG. 4 illustrates a series of images associated with a warping process, in accordance with some implementations.

FIG. 4 illustrates a series of images 400 associated with a warping process such as the depth-based warping process as described with respect to FIG. 3, in accordance with some implementations. Images 400 include a first image 404 of a person 401, a second image 406 of person 401, and a third image 408 of person 401. First image 404 represents an original input image for mono to stereo image processing via a warping process. Second image 406 represents an output image (e.g., a stereo image pair) generated from the first image 404 (e.g., from different viewpoints) via a depth-based warping process (illustrated and described with respect to FIG. 3, supra) utilizing a coordinate image that is up-sampled as a mapping to preserve details such as resolution of first image 404. Accordingly, the aforementioned mono to stereo image processing generates the second image 406 comprising a high resolution for providing a realistic and accurate representation of person 401 without causing an unrealistic, smooth and blurry representation of a face of person 401 as illustrated with respect to image 308. For example, third image 408 represents an output image generated from the first image 404 via a warping process that includes generating a down-sampled image, warping the down sampled image, and performing an up-sampling process using conventional up-sampling techniques thereby resulting in some details (e.g., hair 410, eyes 412a and 412b, and nose 414, etc.) of the original input image (i.e., first image 404) being lost. For example, image 408 comprises an unrealistic, smooth and blurry representation of a face of person 401.

Figure 5:
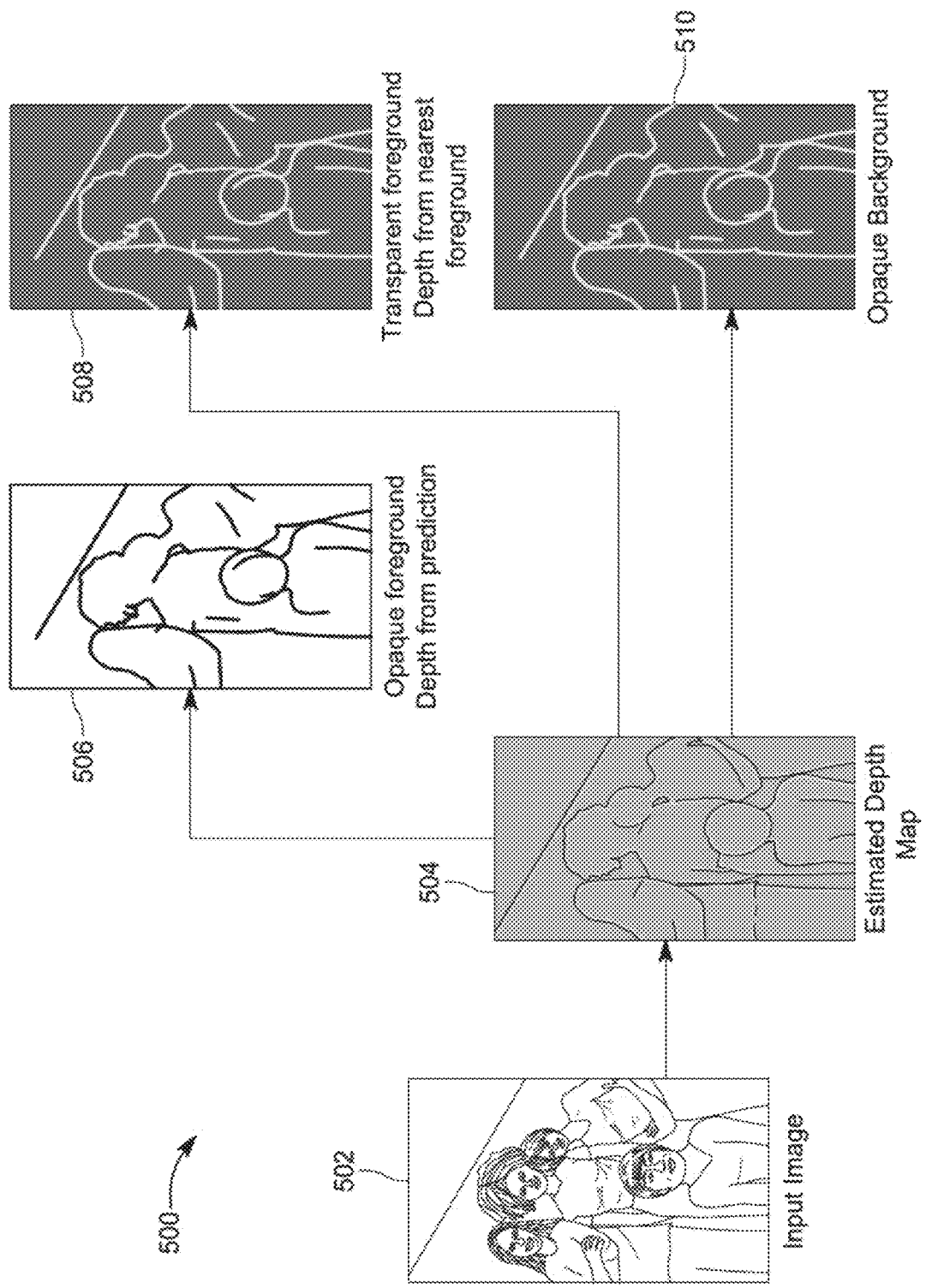
FIG. 5 illustrates a local determination process associated with determining a foreground and a background of an input image, in accordance with some implementations.

FIG. 5 illustrates a local determination process 500 associated with determining a foreground and a background of an input image 502 to convert a mono image to a stereo image pair as described with respect to FIG. 4, in accordance with some implementations. The local determination process 500 enables a classification into a local foreground and background to be determined from an input image 502 and an estimated depth map 504. The estimated depth map 504 is used to split the input image 502 into an opaque foreground layer 506 for rendering and a transparent foreground 508 and opaque background 510 for placement on top of the opaque foreground 506. For example, input image 502 utilizes estimated depth map 504 to classify pixels in boundary regions (e.g., at a hairline, at a face, etc.) as local foreground (e.g., hair) and background (e.g., an environment) regions. The local foreground and background regions may be extended and blended by, for example, using a matting network (e.g., matting network 610 as described with respect to FIG. 6, infra) to determine blending weights, alpha blending values, etc. For example, in a local boundary region, a first portion/pixel may be all local foreground (e.g., hair) and another portion/pixel may be all local background (e.g., wall) and the background and foreground may be rendered separately so that they may be moved independently from each other to enable generation of a clear, focused, and realistic mono to stereo image pair for user presentation.

Figure 6:
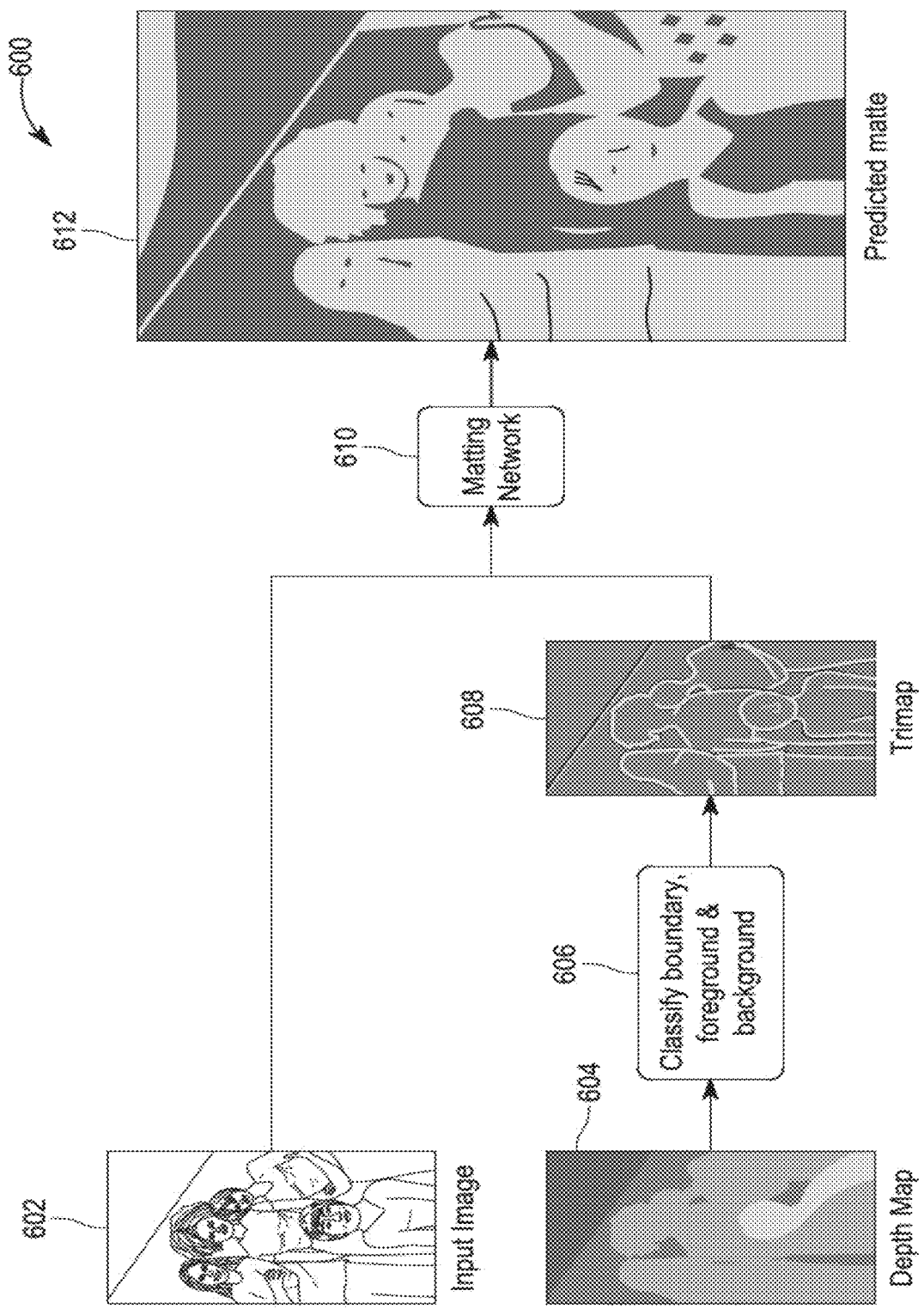
FIG. 6 illustrates a process associated with determining a foreground and background classification, in accordance with some implementations.

FIG. 6 illustrates a process 600 associated with determining a foreground/background classification associated with the local determination process 500 as described with respect to FIG. 5, in accordance with some implementations. The process 600 is associated with rendering transparent regions (of an image) that are partially visible in both a foreground and a background to avoid visual artifacts in a generated stereo image pair for user presentation. Accordingly, the process includes using a depth map 604 to classify boundary, foreground regions and background regions (via a module 606) of an input image 602. Subsequently, two layers of the image 602 are generated locally using a trimap 608 (i.e., a three-channel image/map representing an absolute background, foreground, and unknown regions of input image 602) and a matting network 610 (e.g., a pretrained model) to create a soft alpha matting for boundary regions to be used for blending the foreground and background over each other to generate a predicted alpha matte 612 representing transparency levels of each associated pixel and indicating whether each associated pixel belongs to a foreground or a background of input image 602. Matting network 610 is configured to accurately estimate a transparency of pixels to allow for smooth blending between foreground regions and background regions thereby reducing visual artifacts that may occur with a hard cutoff and thereby providing a visually accurate and appealing stereo image pair for user presentation.

Figure 7A:
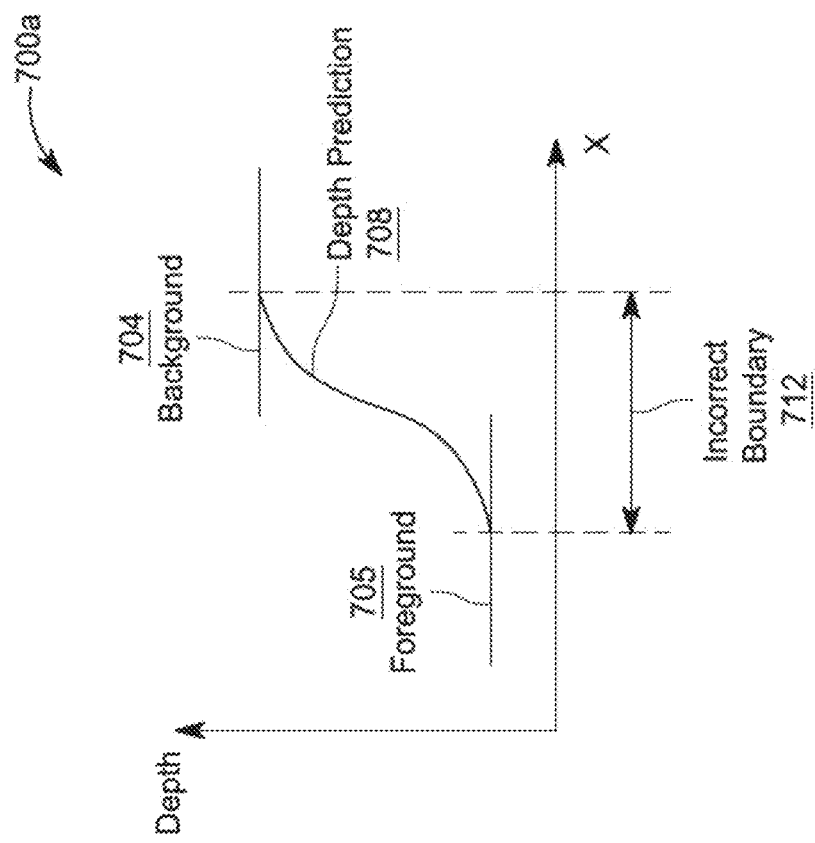
FIG. 7A illustrates a graph representing a foreground and a background of an image portion of an image, in accordance with some implementations.
Figure 7A:
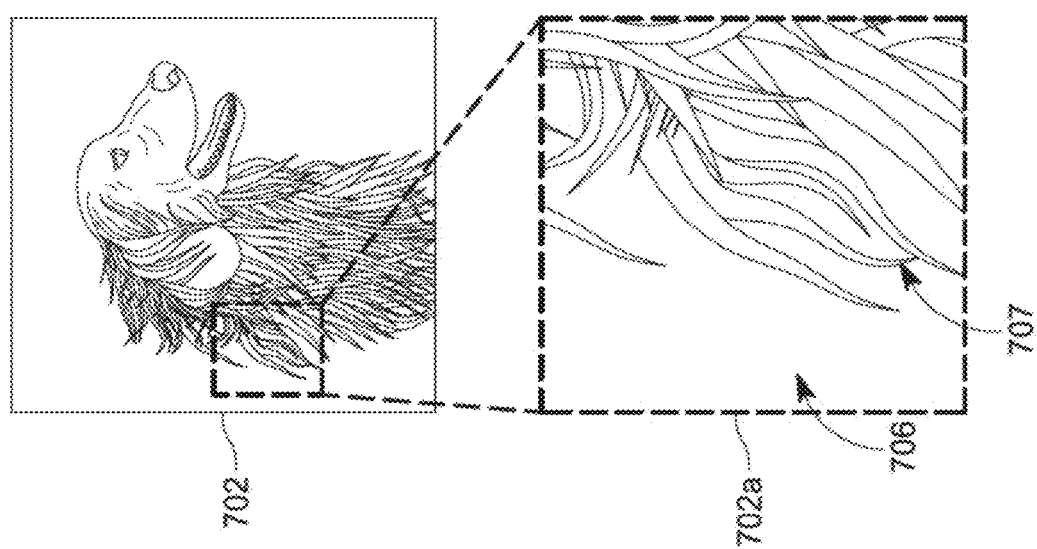

FIG. 7A illustrates a graph 700a representing a foreground 707 and a background 706 of an image portion 702a of an image 702 such as, inter alia, a photo as described with respect to FIGS. 5 and 6, in accordance with some implementations. Foreground 707 comprises hair of a dog and background 706 comprises portions of the image located behind the hair. Graph 700 illustrates a depth prediction representation 708 representing an averaging between a foreground representation 705 (of foreground 707) and a background representation 704 (of background 706). Depth prediction representation 708 is used to classify between foreground representation 705 and background representation 704 but may predict an incorrect boundary 712 between foreground representation 705 (of foreground 707) and a background representation 704 (of background 706). Therefore, the predicted incorrect boundary 712 may be removed as described with respect to FIG. 7B, infra.

Figure 7B:
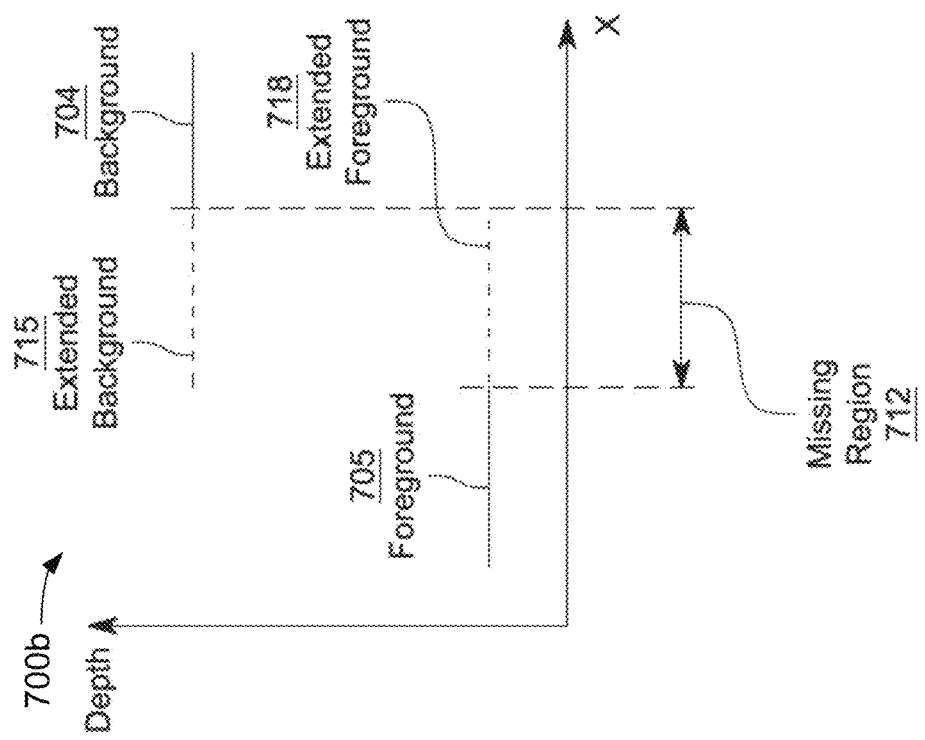
FIG. 7B illustrates a graph modified with respect to the graph of FIG. 7A, in accordance with some implementations.
Figure 7B:
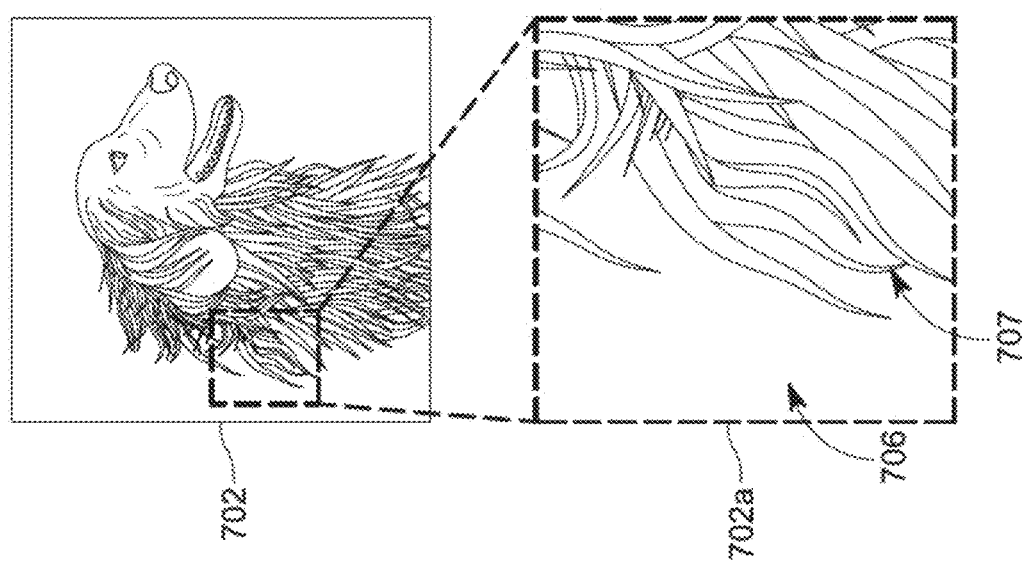

FIG. 7B illustrates a graph 700b modified with respect to graph 700a of FIG. 7A, in accordance with some implementations. Graph 700b illustrates foreground representation 705 (of foreground 707) and background representation 704 (of background 706) with depth prediction representation 708 (of FIG. 7A) removed such that a missing region 712 exists between foreground representation 705 and background representation 704. Likewise, graph 700b illustrates foreground representation 705 being extended (via extended foreground representation portion 718) and background representation 704 being extended (via extended background representation portion 715) such that foreground representation 705 and background representation 704 are currently overlapping with missing content in between. Subsequently, a matting network may be implemented to determine which portion (of image portion 702a) is part of foreground 707 and which portion is part of background 706 to create a realistic and accurate stereo image pair for user presentation.

Figure 8:
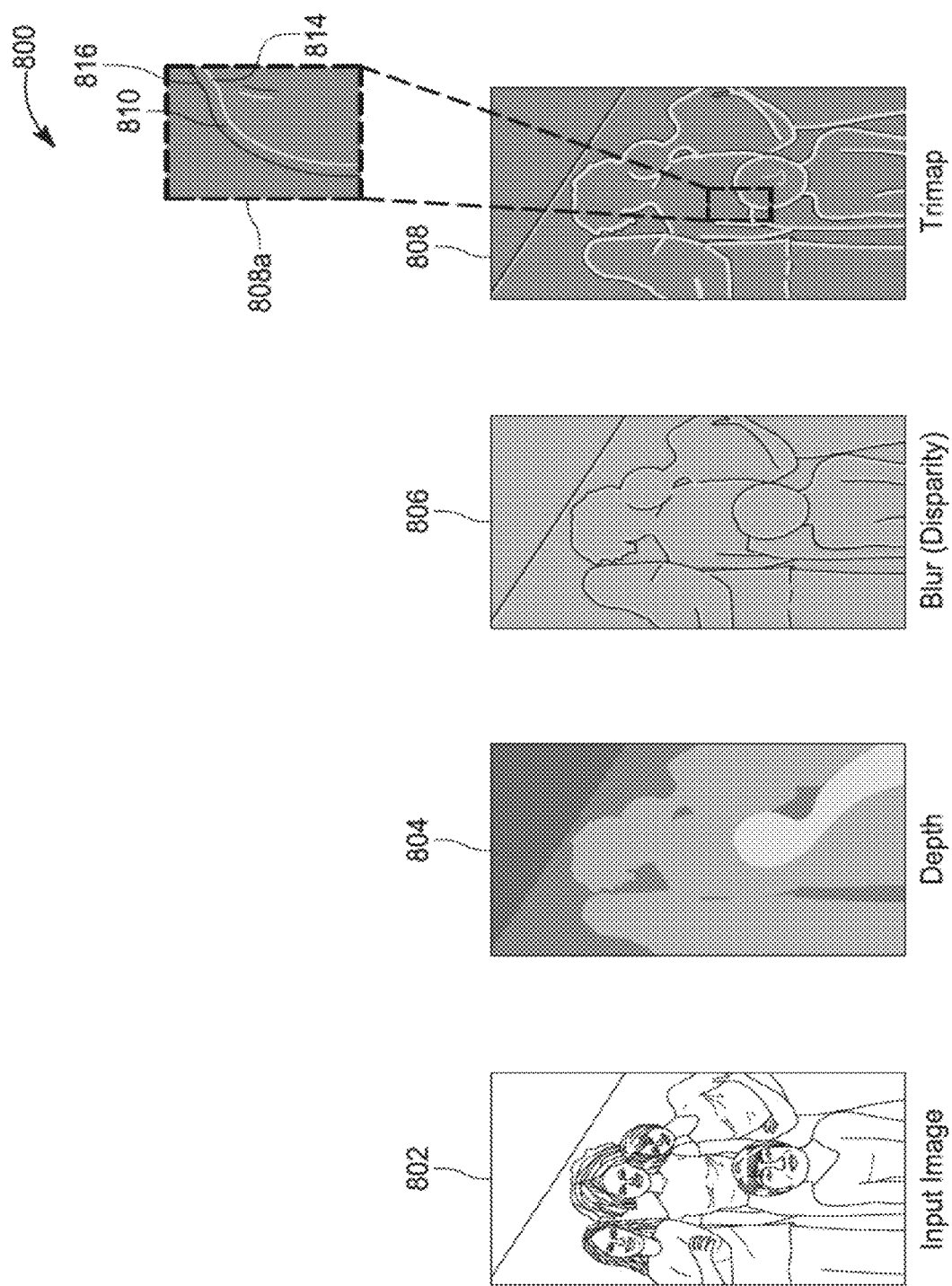
FIG. 8 illustrates a process associated with generating a trimap, in accordance with some implementations.

FIG. 8 illustrates a process 800 associated with generating a trimap 808 to identify a boundary region (e.g., a local region of 1+pixels) of an output image (such as output image 320 of FIG. 3) comprising a stereo image pair based on depth information, in accordance with some implementations. The process 800 receives an input image 802 and associated depth 804 and applies a blur disparity image operator 806 to generate a trimap 808 for classifying input image 802 into a foreground portion and a background portion for input into a matting network (e.g., matting network 610 of FIG. 6) to predict the fine boundaries. Trimap 808 represents local foreground areas, local background areas, and areas between the local foreground areas and local background areas for updating boundary regions of an output image by providing blended content for in-between areas using foreground content and background content. (e.g., using a combination of multiple layers, opaque/transparent features in multiple layers, alpha values, etc.). For example, trimap portion 808a represents a magnified view of a portion of trimap 808 and illustrates a local foreground area 814 and a local background area 816 with a region 810 between being a transition between local foreground area 814 and local background area 816. Therefore, a matting network performs a query to determine soft boundaries between local foreground area 814 and local background area 816 thereby enabling a process for creating stereo image pair for user presentation.

Figure 9:
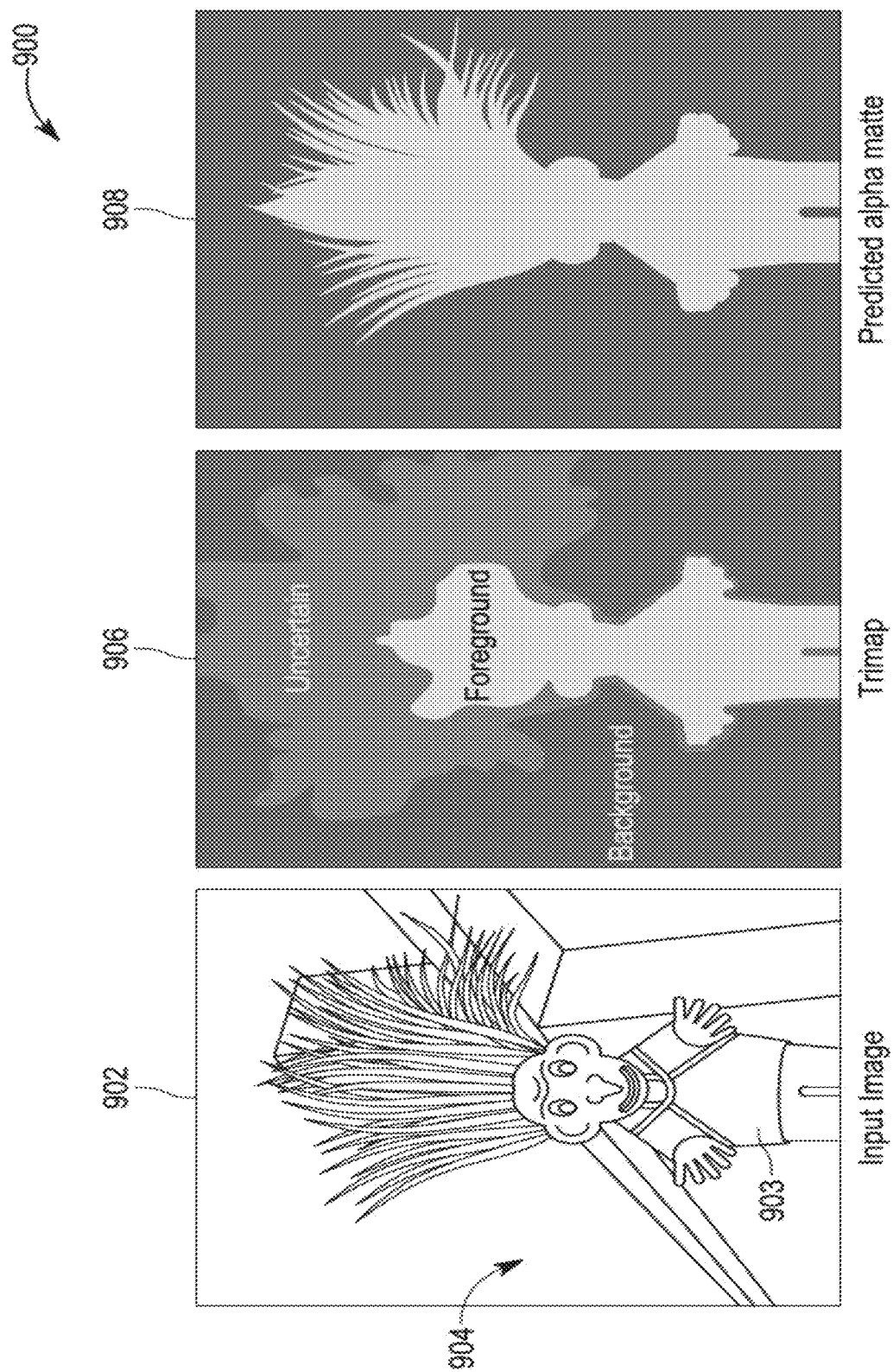
FIG. 9 illustrates a process associated with generating a predicted alpha matte, in accordance with some implementations.

FIG. 9 illustrates a process 900 associated with generating a predicted alpha matte 908 such as matting network 610 of FIG. 6, in accordance with some implementations. The process 900 obtains an input image 902 (comprising a foreground image portion 903 placed over a background image portion 904) and generates/utilizes a trimap 906 (e.g., trimap 808 of FIG. 8) to generate predicted alpha matte 908 (i.e., a grayscale image where each pixel's intensity represents its transparency) by applying an image segmentation algorithm or a deep learning-based segmentation model and using trimap 906 to classify pixels into foreground, background, and unknown regions. Alpha matte 908 comprises an image that includes an additional channel (i.e., an alpha channel) representing a transparency or opacity of each pixel. The alpha channel is configured to define how much of an associated pixel is opaque (visible) and how much of the associated pixel is transparent and may indicate whether an associated pixel belongs to a foreground or background thereby determining which portions of input image 902 should be visible and which parts of input image 902 should be transparent for creating a stereo image pair for viewing.

Figure 10:
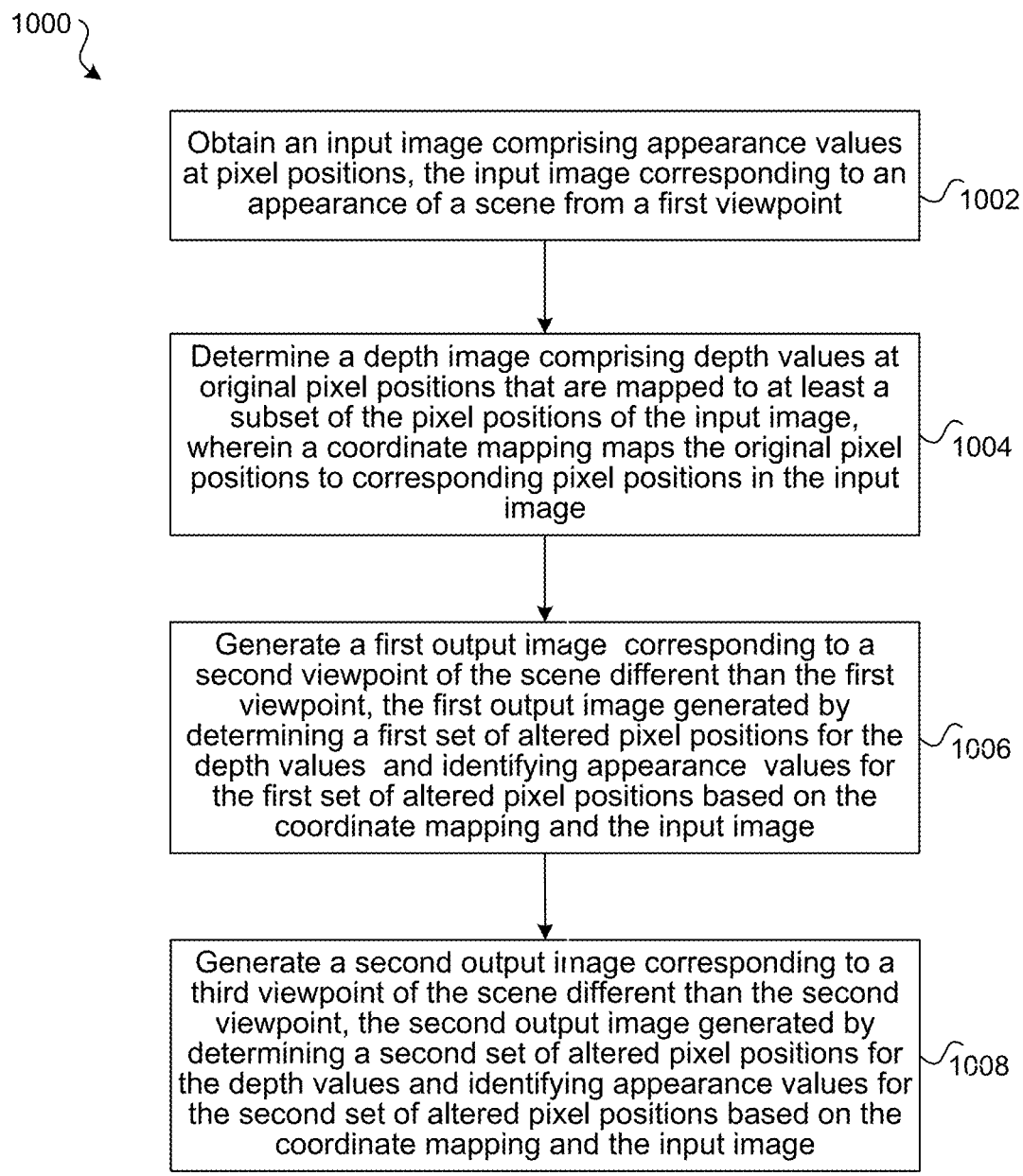
FIG. 10 is a flowchart representation of an exemplary method that dynamically converts a mono image to a stereo image pair by generating two views from an input image associated with a center viewpoint, in accordance with some implementations.

FIG. 10 is a flowchart representation of an exemplary method 1000 that dynamically converts a mono image to a stereo image pair by generating two views from an input image associated with a center viewpoint, in accordance with some implementations. In some implementations, the method 1000 is performed by a device, such as a mobile device, desktop, laptop, HMD, or server device. In some implementations, the device has a screen for displaying images and/or a screen for viewing stereoscopic images such as an HMD (HMD such as e.g., device 105 of FIG. 1). In some implementations, the method 1000 is performed by processing logic, including hardware, firmware, software, or a combination thereof. In some implementations, the method 1000 is performed by a processor executing code stored in a non-transitory computer-readable medium (e.g., a memory). Each of the blocks in the method 1000 may be enabled and executed in any order.

At block 1002, the method 1000 obtains an input image (e.g., a photo) comprising appearance (e.g., color) values at pixel positions. The input image corresponds to an appearance of a scene from a first viewpoint such as, inter alia, a center viewpoint 203 of a user 201 with respect to a device 205 displaying the input image 202 as described, supra, with respect to FIG. 2. The input image may comprise, inter alia, a photo, etc. The appearance values may comprise, inter alia, color values, etc.

At block 1004, the method 1000 determines a depth image comprising depth values at original pixel positions that are mapped to at least a subset of the pixel positions of the input image such that a coordinate mapping maps the original pixel positions to corresponding pixel positions in the input image such as a depth image 202a as described, supra, with respect to FIG. 2. In some implementations, the depth image may be generated based on assessing the input image with a neural network. In some implementations, the coordinate mapping may be a coordinate image. In some implementations, the depth image may be generated based on rule-based/deterministic approaches using predefined rules and/or algorithms to manipulate depth data from images. Rule-based/deterministic approaches may include techniques such as, inter alia, depth thresholding, edge detection, histogram analysis, depth filtering, etc.

At block 1006, the method 1000 generates a first output image corresponding to a second viewpoint of the scene different than the first viewpoint. The first output image may be generated by determining a first set of altered pixel positions for the depth values and identifying appearance values for the first set of altered pixel positions based on the coordinate mapping and the input image. For example, the first output image may be a left eye output image such as left eye view (output) image 202b as described, supra, with respect to FIG. 2.

In some implementations, generating the first output image may include identifying appearance values for the additional pixel positions in addition to the second set of altered pixel positions based on the coordinate mapping and the input image. In some implementations, identifying the appearance values for the additional pixel positions may include: identifying an intermediate pixel position between two adjacent pixel positions in the second set of altered pixel positions; and identifying an appearance value for the intermediate pixel position by identifying a pixel position in the input image between the pixel positions in the input image corresponding to the two adjacent pixel positions according to the coordinate mapping.

At block 1008, the method 1000 generates a second output image corresponding to a third viewpoint of the scene different than the second viewpoint. The second output image may be generated by determining a second set of altered pixel positions for the depth values and identifying appearance values for the second set of altered pixel positions based on the coordinate mapping and the input image. For example, the first output image may be a right eye output image such as right eye view (output) image 202c as described, supra, with respect to FIG. 2.

In some implementations, the first viewpoint may correspond to a center viewpoint, the second viewpoint may correspond to a left eye viewpoint, and the third viewpoint may correspond to a right eye viewpoint as described with respect to FIG. 2. In some implementations, the first output image may be a left eye image produced based on the input image and a first coordinate image that is (a) determined based on the depth image and (b) warped for the left eye viewpoint. In some implementations, the second output image may be a right eye image is produced based on the input image and a second coordinate image that is (a) determined based on the depth image and (b) warped for the right eye viewpoint. The two different views (i.e., the right eye viewpoint and the left eye viewpoint) are generated so that a 2D image may be viewed in 3D. In some implementations, using a center input image to create two viewpoint images (for viewing in 3D) may enable the process to perform less adjustments with respect to the viewpoint thereby resulting in smaller holes to fill or hide with alpha blending. Likewise, using a center input image to create two viewpoint images may enable an accurate determination of a distance of the viewpoint with respect to objects.

Some implementations further provide the first output image and the second output image to form a stereo output image pair depicting the scene for viewing on a stereoscopic display of an HMD. For example, output image pair 218 as described with respect to FIG. 2.

Figure 11:
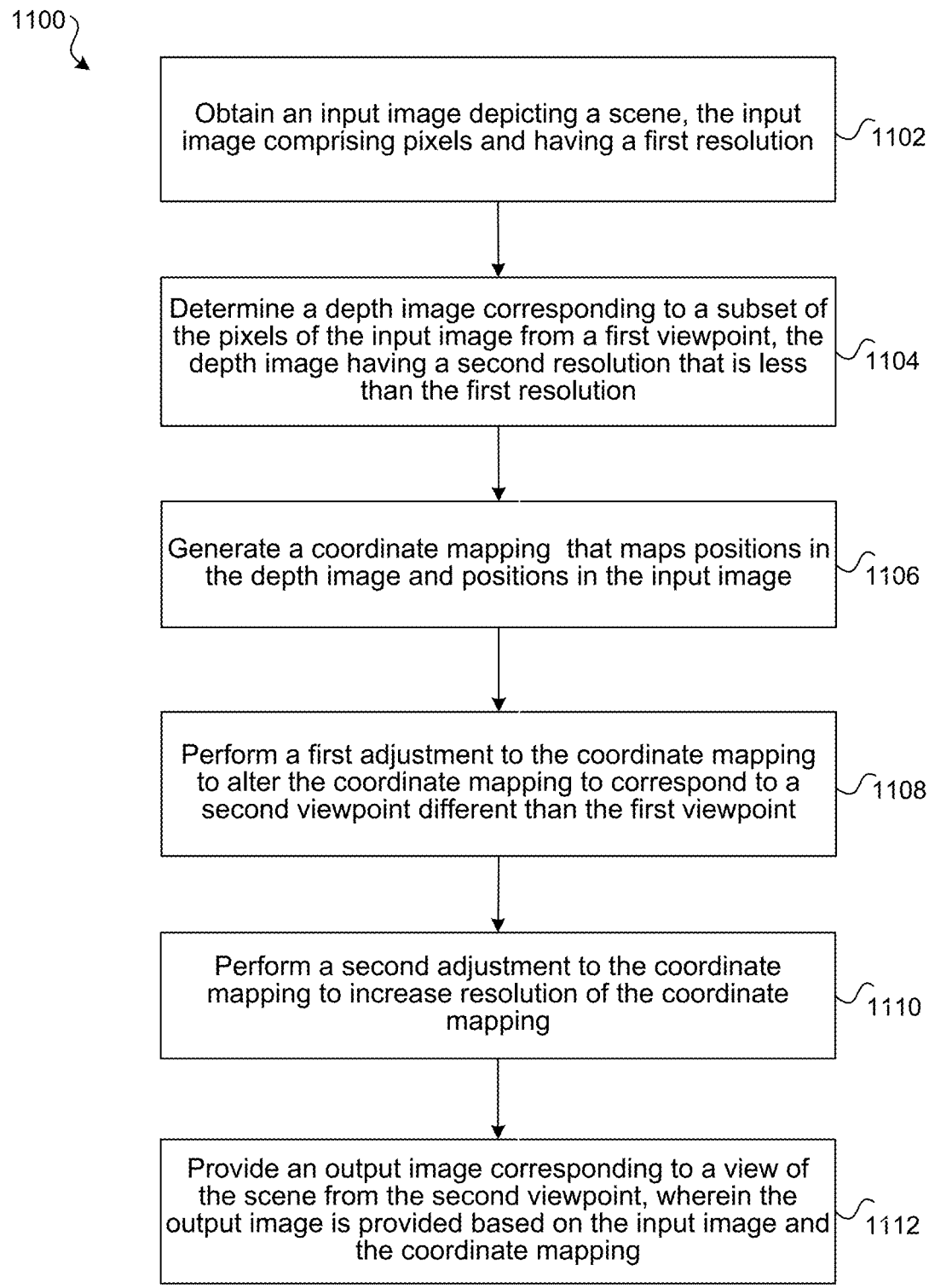
FIG. 11 is a flowchart representation of an exemplary method that dynamically converts a mono image to a stereo image pair using a depth-based warping process, in accordance with some implementations.

FIG. 11 is a flowchart representation of an exemplary method 1100 that dynamically converts a mono image to a stereo image pair using a depth-based warping process, in accordance with some implementations. In some implementations, the method 1100 is performed by a device, such as a mobile device, desktop, laptop, HMD, or server device. In some implementations, the device has a screen for displaying images and/or a screen for viewing stereoscopic images such as an HMD (HMD such as e.g., device 105 of FIG. 1). In some implementations, the method 1100 is performed by processing logic, including hardware, firmware, software, or a combination thereof. In some implementations, the method 1100 is performed by a processor executing code stored in a non-transitory computer-readable medium (e.g., a memory). Each of the blocks in the method 1100 may be enabled and executed in any order.

At block 1102, the method 1100 obtains an input image (e.g., a photo such as original input image 302 as described with respect to FIG. 3) depicting a scene. The input image may include pixels and have a first resolution.

At block 1104, the method 1100 determines a depth image (e.g., depth map 318 as described with respect to FIG. 3) corresponding to a subset of the pixels of the input image from a first viewpoint. The depth image may have a second resolution that is less than the first resolution. The depth image may be generated based on assessing the input image with a neural network. Alternatively, the depth image may be generated based on rule-based/deterministic approaches using predefined rules and/or algorithms to manipulate depth data from images. Rule-based/deterministic approaches may include techniques such as, inter alia, depth thresholding, edge detection, histogram analysis, depth filtering, etc.

At block 1106, the method 1100 generates a coordinate mapping (e.g., a coordinate image such as coordinate image 308 as described with respect to FIG. 3) that maps positions in the depth image and positions in the input image.

At block 1108, the method 1100 performs a first adjustment (e.g., via a warping process executed by a forward warp module 310 as described with respect to FIG. 3) to the coordinate mapping to alter the coordinate mapping to correspond to a second viewpoint different than the first viewpoint. The first adjustment may comprise warping the coordinate image and may be determined based on disparity information determined based on the depth image. In some implementations during the first adjustment, the input image (i.e., low resolution image) is warped to one or two viewpoints such as, for example, generating a left eye view from a right eye view, generating a right eye view from a left eye view, generating both eye views from a center viewpoint, etc. In some implementations, generating a left eye view and a right eye view may be performed sequentially in series. In some implementations, generating a left eye view and a right eye view may be performed simultaneously in parallel.

At block 1110, the method 1100 performs a second adjustment (e.g., up-sampling such as up-sampling process 319 as described with respect to FIG. 3) to the coordinate mapping to increase resolution of the coordinate mapping. The second adjustment may include up-sampling the coordinate mapping. Additionally or alternatively, the second adjustment may include up-sampling the coordinate mapping from the second resolution to the first resolution. In some implementations, up-sampling may include interpolating between pixel positions for intermediate pixels of the coordinate mapping.

At block 1112, the method 1100 provides an output image (e.g., output image 317 as described with respect to FIG. 3) corresponding to a view of the scene from the second viewpoint. The output image may be provided based on the input image and the coordinate mapping.

In some implementations, the input image and output image together provide a stereo pair of images depicting the scene. In some implementations, the input image may correspond to a center viewpoint and the output image(s) may correspond to a left eye image or a right eye image of a stereo pair of images depicting the scene. In some implementations, output images may be generated sequentially in series. In some implementations, output images may be generated simultaneously in parallel.

In some implementations, the left eye image may be produced based on the input image and a first coordinate image that is (a) determined based on the depth image, (b) warped for a left eye viewpoint; and (c) increased in resolution. Likewise, the right eye image may be produced based on the input image and a second coordinate image that is (a) determined based on the depth image, (b) warped for a right eye viewpoint; and (c) increased in resolution as described with respect to FIG. 3.

In some implementations, providing the output image may include using pixel values of the input image at pixel locations in the output image based on the coordinate mapping. In some implementations, the output image may be provided as a part of a stereo image pair depicting the scene for viewing on a stereoscopic display of an HMD.

Figure 12:
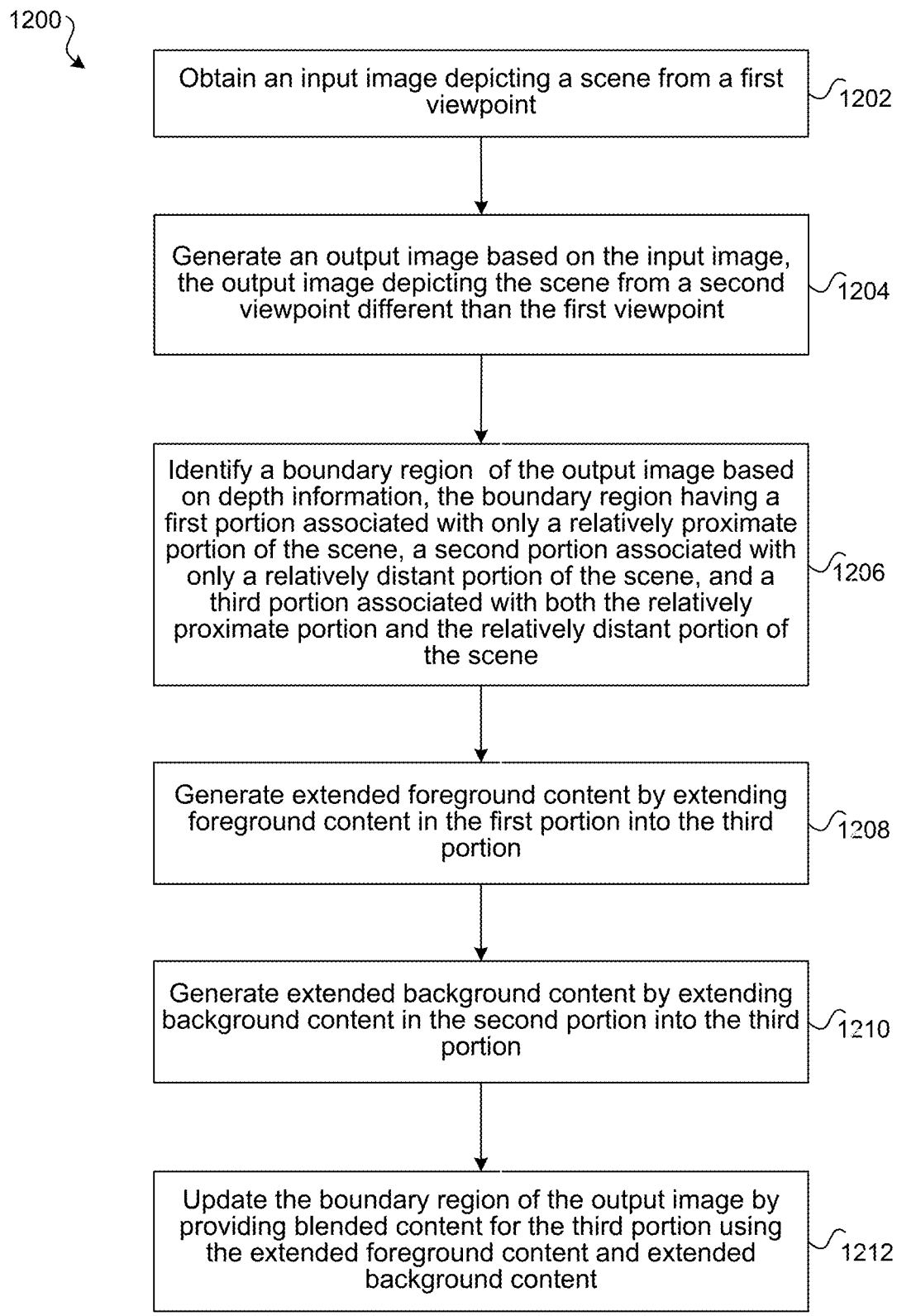
FIG. 12 is a flowchart representation of an exemplary method that dynamically converts a mono image to a stereo image pair using a boundary adjustment process, in accordance with some implementations.

FIG. 12 is a flowchart representation of an exemplary method 1200 that dynamically converts a mono image to a stereo image pair using a boundary adjustment process, in accordance with some implementations. In some implementations, the method 1200 is performed by a device, such as a mobile device, desktop, laptop, HMD, or server device. In some implementations, the device has a screen for displaying images and/or a screen for viewing stereoscopic images such as an HMD (HMD such as e.g., device 105 of FIG. 1). In some implementations, the method 1200 is performed by processing logic, including hardware, firmware, software, or a combination thereof. In some implementations, the method 1200 is performed by a processor executing code stored in a non-transitory computer-readable medium (e.g., a memory). Each of the blocks in the method 1200 may be enabled and executed in any order.

At block 1202, the method 1200 obtains an input image (e.g., image 702 as described with respect to FIGS. 7A and 7B) depicting a scene from a first viewpoint such as center viewpoint 203 as described with respect to FIG. 2.

At block 1204, the method 1200 generates an output image based on the input image. The output image may depict the scene from a second viewpoint differing than the first viewpoint.

At block 1206, the method 1200 identifies a boundary region of the output image based on depth information such as depth prediction representation 708 described with respect to FIG. 7A. The boundary region may include a first portion associated with only a relatively proximate portion of the scene (e.g., foreground 707 as described with respect to FIG. 7A), a second portion associated with only a relatively distant portion of the scene (e.g., background 706 as described with respect to FIG. 7A), and a third portion associated with both the relatively proximate portion and the relatively distant portion of the scene (e.g., trimap 808 as described with respect to FIG. 8).

At block 1208, the method 1200 generates extended foreground content by extending foreground content in the first portion into the third portion. For example, extended foreground representation portion 718 as described with respect to FIG. 7B.

At block 1210, the method 1200 generates extended background content by extending background content in the second portion into the third portion. For example, extended background representation portion 715 as described with respect to FIG. 7B.

At block 1212, the method 1200 updates the boundary region of the output image by providing blended content for the third portion using the extended foreground content and extended background content. For example, updating the boundary region may include, inter alia, using a combination of multiple layers, opaque/transparent features in multiple layers, alpha values, etc. A blending process may utilize a matting neural network. For example, matting network 610 as described with respect to FIG. 6.

In some implementations, the input image and output image together provide a stereo pair of images depicting the scene. For example, stereo output image pair 218 as described with respect to FIG. 2. In some implementations, the input image corresponds to a center viewpoint, and the output image corresponds to a left eye image or a right eye image of a stereo pair of images depicting the scene as described with respect to FIG. 2. Likewise, the left eye image may be produced based on warping the input image for a left eye viewpoint and the right eye image may be produced based on warping the input image for a right eye viewpoint. In some implementations, providing the output image includes providing a stereo image pair depicting the scene for viewing on a stereoscopic display of an HMD.

In some implementations, the output image may be updated by updating multiple boundary regions using different foreground versus background content thresholds for the boundary regions. In some implementations, updating the boundary region may include using the extended foreground content and extended background content in different display layers. In some implementations, updating the boundary region may include using the extended foreground content in a first display layer that is displayed on top of a second display that displays the extended background content. In some implementations, providing the blended content may include displaying the extended foreground content on a layer that is partially transparent. In some implementations, providing the blended content may include displaying the extended foreground content with an alpha value to blend with the extended background content. In some implementations, providing the blended content may include inputting the extended foreground content and the extended background content into a matting network.

Figure 13:
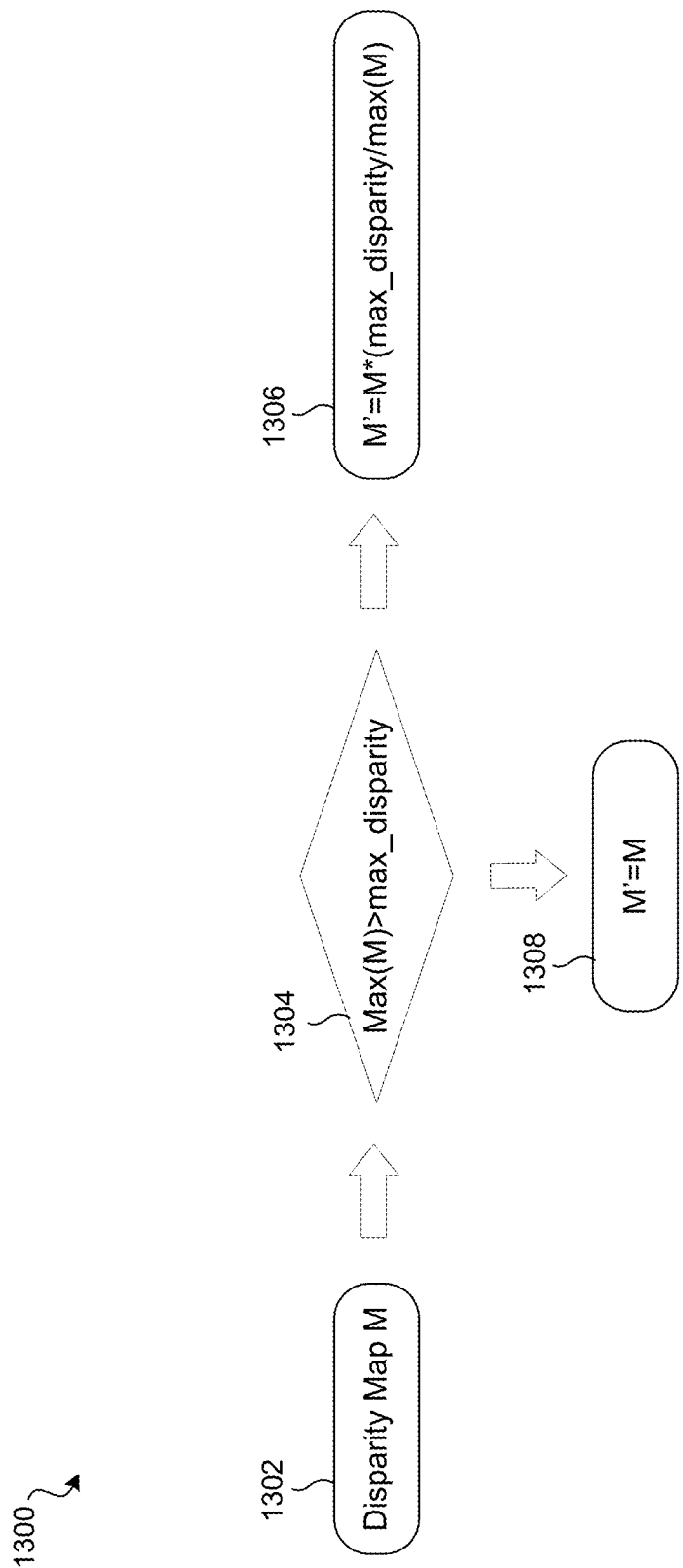
FIG. 13 is a workflow representation that enables modification of a disparity map for a stereo pair of images with respect to a maximum disparity parameter, in accordance with some implementations.

FIG. 13 is a workflow representation 1300 that enables modification of a disparity map for a stereo pair of images with respect to a maximum disparity parameter, in accordance with some implementations.

In some instances, stereo 3D image and video playback may cause visual discomfort (for users of, for example, an HMD) due to vergence accommodation conflict such as, inter alia, a presence (within a view via, for example, of an HMD) of objects in a scene (e.g., close to a viewpoint) comprising excessive disparity or negative parallax, which may cause focus difficulties during viewing and may lead to excessive retinal disparity and visual discomfort. Likewise, a same 3D image or video rendered in stereo may cause differing levels of discomfort for different users viewing 3D content. Furthermore, some users may prefer a higher level of immersion and depth experience with respect to 3D content associated with a large disparity or parallax. Therefore, comfort-based 3D style presets for stereo 3D content playback and rendering may be enabled to account for the aforementioned visual discomfort issues and varying levels of immersion preferred by differing users. The comfort-based 3D style presets may be configured to address differing 3D content viewing preferences of different users to deliver differentiated levels of stereo visual comfort and levels of immersion.

In some implementations, 3D style presets may be enabled with respect to, inter alia, a high comfort level preset, a medium comfort level preset, and a low comfort level preset. For example, a high comfort level preset may provide conservative tuning attributes for disparity parameters for 3D spatial images and videos to provide comfort settings for users (viewers) that may be sensitive to high parallax and depth attributes. Likewise, a low comfort level preset may provide a relaxed tuning of disparity parameters for 3D spatial images and videos to provide comfort settings for users (viewers) that may prefer being exposed to high parallax and depth. Additionally, a medium comfort level preset may provide fine tuning of disparity parameters to achieve an intermediate level of stereo visual comfort and level of immersion that provides a preset level that is in between a high comfort level preset and a low comfort level preset.

In some implementations, a 3D style preset may be governed by the selection of two disparity parameters to achieve differentiated levels of stereo visual comfort and levels of immersion. For example, a first disparity parameter may comprise a maximum disparity parameter and a second disparity parameter may comprise disparity adjustment parameter.

A maximum disparity parameter (e.g., a maximum negative parallax) represents a maximum near-field depth to be perceived by a user viewing a stereo 3D image or video. Likewise, a maximum disparity parameter may be defined as a maximum amount of negative horizontal disparity present between a left eye view and right eye view of 3D spatial images or videos (e.g., spanning an entire duration of a video).

In some implementations, a disparity map (as illustrated in block 1302) may be available for a pair of synthesized stereo images and its maximum value may be constrained by a maximum disparity parameter thereby enabling a perceived depth resulting from stereo playback of the 3D spatial image or video to be controlled to match a targeted level of comfort for an associated 3D style preset.

In some implementations, workflow representation 1300 represents a process for enabling a disparity map (M) (as illustrated in block 1302) associated with a stereo pair of images to be modified (e.g., scaled) to generate a modified disparity map (M') (as illustrated in block 1306) if a maximum map disparity (Max M) is greater than a maximum disparity parameter (max_disparity) as illustrated in block 1304. Likewise, if a maximum map disparity (Max M) is not greater than a maximum disparity parameter (max_disparity) then it may be determined that disparity map (M) is equivalent to a modified disparity map (M') as illustrated in block 1308. In some implementations, a modified disparity map (M') may be determined via the following equation illustrated in block 1306 as follows: M'=M*(max_disparity/max(M). Subsequently, a stereo pair of images may be synthesized from the modified disparity map (M') to control the amount of perceived depth by the viewer.

In some implementations, a maximum disparity parameter (max_disparity) may be applied to a disparity map (M) corresponding to a stereo pair of synthesized images with a specified reference resolution. Likewise, comfort-tuning of disparity for defined 3D style presets may be performed with respect to a target set of real-world disparities (i.e., one target real-world disparity for each defined 3D style preset) as a perceived depth may be determined by real-world disparity associated with comfort-tuning for the defined 3D style presets.

In some implementations a relationship between real-world disparity and a maximum disparity for a given reference horizontal resolution may be as follows:

$$\text{real\_world\_disparity} = \text{viewing\_distance} * 2 * \tan(\frac{hFOV}{2}) * \frac{\text{max\_disparity}}{\text{ref\_resolution}}$$

In the forementioned relationship, hFOV is a horizontal field of view occupied by rendered stereo images, viewing_distance represents a distance between a viewer and a screen (e.g., of an HMD), max_disparity represents a maximum disparity for a given reference horizontal resolution, and ref_resolution is a reference horizontal resolution for synthesized images.

In some implementations, a maximum disparity parameter (max_disparity) may be a maximum allowed disparity universally set for all types of stereo 3D images or videos. In some implementations, a maximum disparity parameter (max_disparity) may be adaptive with respect to each asset as a statistic from a reference disparity map. For example, a maximum disparity parameter (max_disparity) may be selected as a maximum value for a reference disparity map of one asset. Alternatively, a maximum disparity parameter (max_disparity) may be selected based on a given percentile distribution from a reference disparity map.

In some implementations, stereo playback and rendering of 3D spatial images and videos may be associated with different viewing configurations and varying screen sizes (e.g., with respect to width and height) and distances. Changes in viewing configurations with different screen distances and sizes may lead to variations in real world disparity for rendering of a given 3D spatial image or video thereby impacting a perceived depth and stereo visual comfort. Therefore, each 3D style preset may have different target real-world disparities for different viewing configurations to maintain a same target level of stereo visual comfort. For example, a disparity map may be scaled according to a maximum disparity parameter for a given 3D style preset and a given viewing configuration (e.g., a reference viewing configuration with a reference screen distance and reference screen size, such as width and height) with respect to an aspect ratio of a 3D spatial image or video.

In some implementations with respect to an alternative viewing configuration, a necessary modification to a disparity map in order to match target real-world disparity of a given 3D style preset may require a disparity_adjustment to be applied to a disparity map (M) as follows:

$$\text{disparity\_adjustment} = \frac{\text{max\_disparity}}{\text{ref\_resolution}} - \frac{\text{real\_world\_disparity\_mode}}{\text{width\_in\_meters}}$$

In the forementioned disparity adjustment, max_disparity represents a maximum disparity for a given reference viewing mode, ref_resolution is a reference horizontal resolution for synthesized images, width_in_meters represents a width of a rendered image in meters for a given viewing configuration, and real_world_disparity_mode represents a target real_world_disparity for a given 3D style preset and given viewing configuration.

In some implementations, a post-processing method may be combined with disparity_adjustment to further constrain a range. For example, disparity_adjustment may be set based on max (thr, disparity_adjustment) to allow an adjustment only when it exceeds a pre-defined threshold (thr). Likewise, disparity_adjustment may be determined according to a function: LUT (disparity_adjustment), where a disparity_adjustment value is obtained from a look up table LUT that is pre-configured.

In some implementations, comfort-based 3D style presets for stereo 3D content playback and rendering may include adjustments or presets associated with, inter alia, motion parameters, binocular rivalry parameters, vertical disparity parameters, poor image quality parameters, low light parameters, cardboard effect parameters (e.g., flattened depth planes), puppet-theater effect parameters (e.g., unnatural object sizes and shapes), color/luminance/sharpness mismatch parameters, etc.

In some implementations, motion (e.g., camera motion within captured video or content motion within video and resultant judder and stutter artifacts) may induce differing levels of visual discomfort for different users. Therefore, various objective measures of quantifying motion such as pixel difference metrics or optical flow based metrics may be used to define various 3D styles presets based on motion comfort levels thereby provisioning a video experience differently for different 3D style presets, e.g., by adapting a screen size differently for different presets to reduce the discomforting impacts of motion.

Vertical disparity caused by epipolar misalignment between the stereo image pairs due to calibration errors may induce differing levels of visual discomfort for different users. Likewise, binocular rivalry triggered by lack of stereo correspondence (e.g., due to artifacts from imperfections in occlusion inpainting) may induce differing levels of visual discomfort for different users. Therefore, various metrics may be evaluated to, e.g., determine an amount of vertical disparity as a percentage of an image width or to detect and quantify the size of occluded regions. The evaluated metrics be used to define 3D style presets and map them to different types of stereo content experiences.

Figure 14:
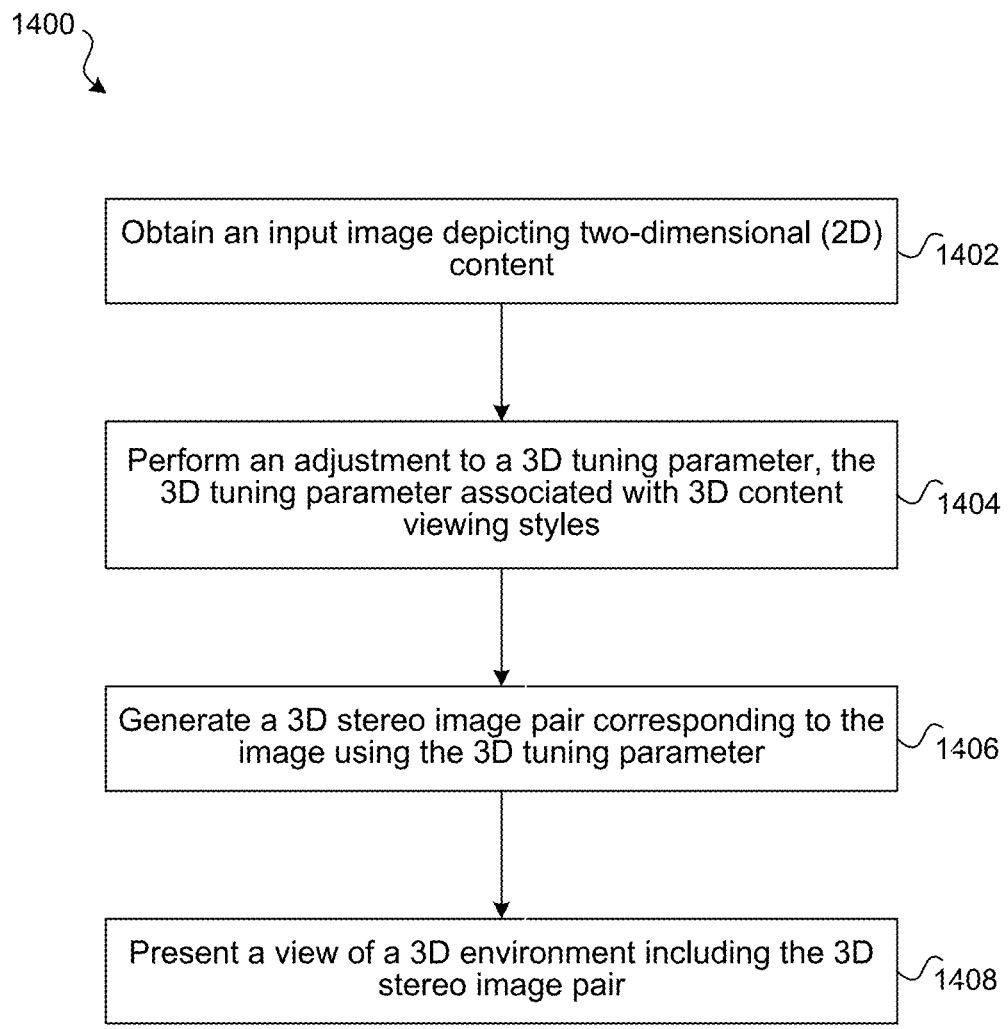
FIG. 14 is a flowchart representation of an exemplary method that enables comfort-based 3D style presets for adjusting comfort parameters for viewing stereo 3D content via a device such as an HMD, in accordance with some implementations.

FIG. 14 is a flowchart representation of an exemplary method 1400 that enables comfort-based 3D style presets for adjusting comfort parameters for viewing stereo 3D content via a device such as an HMD, in accordance with some implementations. In some implementations, the method 1400 is performed by a device, such as a mobile device, desktop, laptop, HMD, or server device. In some implementations, the device has a screen for displaying images and/or a screen for viewing stereoscopic images such as an HMD (an HMD such as e.g., device 105 of FIG. 1). In some implementations, the method 1400 is performed by processing logic, including hardware, firmware, software, or a combination thereof. In some implementations, the method 1400 is performed by a processor executing code stored in a non-transitory computer-readable medium (e.g., a memory). Each of the blocks in the method 1400 may be enabled and executed in any order.

At block 1402, the method 1400 obtains an image (e.g., input image 202 as described with respect to FIG. 2) depicting 2D content.

At block 1404, an adjustment is performed with respect to a 3D tuning parameter associated with 3D content viewing styles such as, inter alia, disparity parameter presets associated with a disparity level present between a left eye view and right eye view of 3D spatial images or videos as described with respect to FIG. 13.

In some implementations, performing the adjustment to the 3D tuning parameter may include modifying a disparity map (e.g., disparity map (M) as illustrated in block 1302 of FIG. 13) based on a maximum disparity parameter (max_disparity) as illustrated in block 1304 of FIG. 13). The modified disparity map may be used to perform the adjustment to control an amount of perceived depth within a subsequent view of a 3D environment. In some implementations, the maximum disparity parameter may be determined as a function of a viewing distance, a horizontal field of view, a reference resolution and a target real-world disparity as described with respect to FIG. 13.

In some implementations, performing the adjustment to the 3D tuning parameter may include performing a disparity adjustment by modifying a disparity map (e.g., disparity map (M) if FIG. 13) to match a target real-world disparity as described with respect to FIG. 13. In some implementations, the disparity adjustment parameter is determined as a function of a maximum disparity for a given reference viewing mode, a reference resolution, a width of the rendered image and a target real world disparity as described with respect to FIG. 13.

In some implementations, the disparity adjustment is performed when a maximum disparity parameter (e.g., maximum disparity parameter (max_disparity) as illustrated in block 1304 as described with respect to FIG. 13) exceeds a threshold level.

In some implementations, performing the adjustment to the 3D tuning parameter may include modifying scene depth characterization formats differing from disparity modifications.

In some implementations, performing the adjustment to the 3D tuning parameter may include activating a preset 3D tuning parameter.

In some implementations, performing the adjustment to the 3D tuning parameter may include variably adjusting the 3D tuning parameter.

In some implementations, performing the adjustment to the 3D tuning parameter may be in response to user input.

In some implementations, performing the adjustment to the 3D tuning parameter may include modifying a motion parameter within a subsequent view of a 3D environment.

In some implementations, performing the adjustment to the 3D tuning parameter may include modifying a binocular rivalry parameter within a subsequent view of a 3D environment.

In some implementations, performing the adjustment to the 3D tuning parameter may include modifying a vertical display parameter within a subsequent view of a 3D environment.

In some implementations, performing the adjustment to the 3D tuning parameter may include modifying a poor image quality parameter within a subsequent view of a 3D environment.

In some implementations, performing the adjustment to the 3D tuning parameter may include modifying a low light parameter within a subsequent view of a 3D environment.

In some implementations, performing the adjustment to the 3D tuning parameter may include modifying a cardboard effect (e.g., flattened depth planes) parameter within a subsequent view of a 3D environment.

In some implementations, performing the adjustment to the 3D tuning parameter may include modifying a puppet-theater effect (e.g., unnatural object sizes and shapes) parameter within a subsequent view of a 3D environment.

In some implementations, performing the adjustment to the 3D tuning parameter may include modifying a color, luminance, or sharpness mismatch parameter within a subsequent view of a 3D environment.

At block 1406, a 3D stereo image pair corresponding to the image is generated using the 3D tuning parameter as described with respect to FIG. 13.

At block 1408, a view of a 3D environment including the 3D stereo image pair is presented to user via, for example, an HMD as described with respect to FIG. 13.

Figure 15:
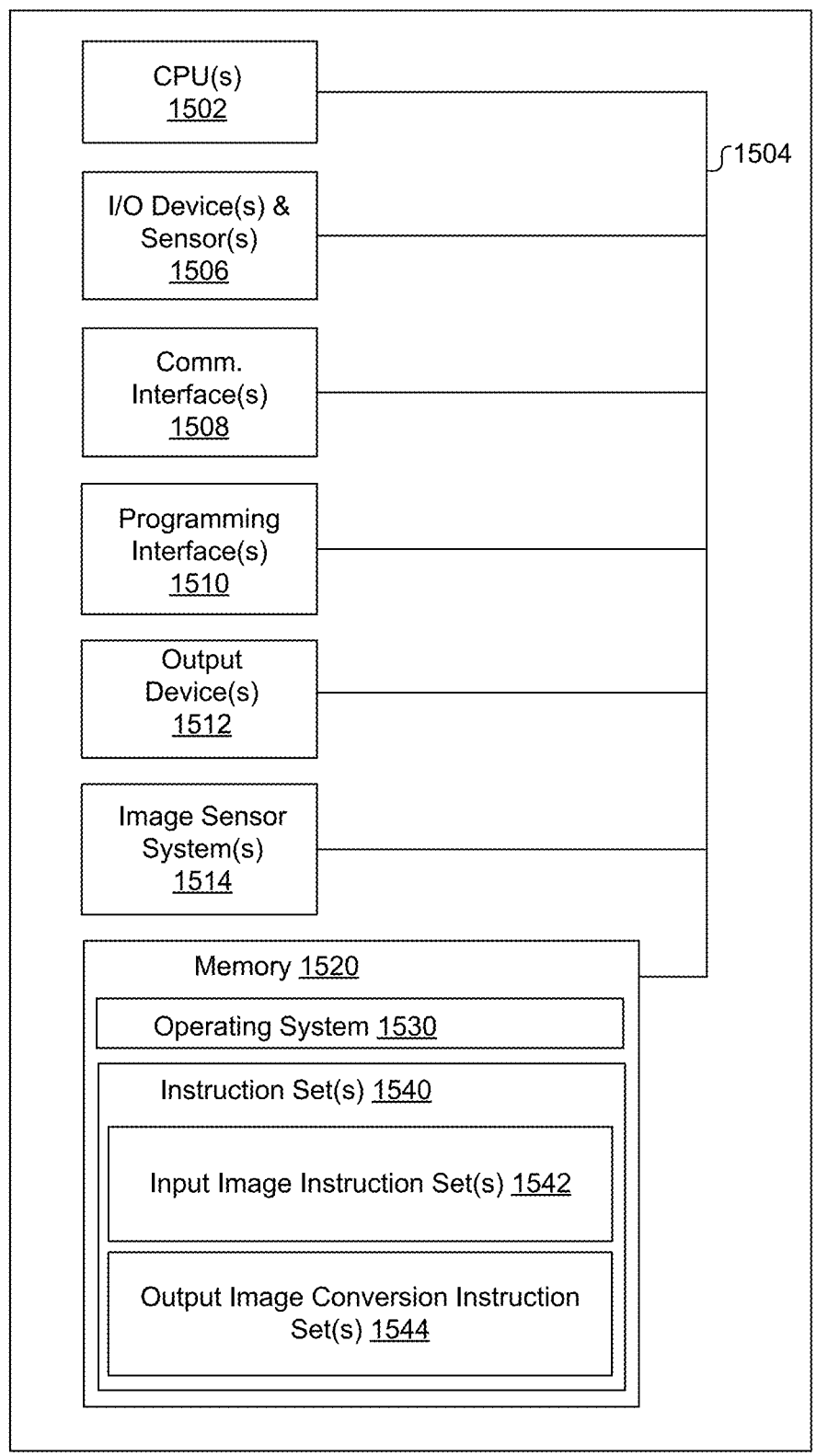
FIG. 15 is a block diagram of an electronic device of in accordance with some implementations.

FIG. 15 is a block diagram of an example device 1500. Device 1500 illustrates an exemplary device configuration for electronic device 105 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1500 includes one or more processing units 1502 (e.g., microprocessors, ASICs, FPGAS, GPUs, CPUs, processing cores, and/or the like), one or more input/output (I/O) devices and sensors 1504, one or more communication interfaces 1508 (e.g., USB, FIREWIRE, THUNDERBOLT, IEEE 802.3x, IEEE 802.11x, IEEE 802.14x, GSM, CDMA, TDMA, GPS, IR, BLUETOOTH, ZIGBEE, SPI, I2C, and/or the like type interface), one or more programming (e.g., I/O) interfaces 1510, output devices (e.g., one or more displays) 1512, one or more interior and/or exterior facing image sensor systems 1514, a memory 1520, and one or more communication buses 1504 for interconnecting these and various other components.

In some implementations, the one or more communication buses 1504 include circuitry that interconnects and controls communications between system components. In some implementations, the one or more I/O devices and sensors 1506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), one or more cameras (e.g., inward facing cameras and outward facing cameras of an HMD), one or more infrared sensors, one or more heat map sensors, and/or the like.

In some implementations, the one or more displays 1512 are configured to present a view of a physical environment, a graphical environment, an extended reality environment, etc. to the user. In some implementations, the one or more displays 1512 are configured to present content (determined based on a determined user/object location of the user within the physical environment) to the user. In some implementations, the one or more displays 1512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 1512 correspond to diffractive, reflective, polarized, holographic, etc. waveguide displays. In one example, the device 1500 includes a single display. In another example, the device 1500 includes a display for each eye of the user.

In some implementations, the one or more image sensor systems 1514 are configured to obtain image data that corresponds to at least a portion of the physical environment 100. For example, the one or more image sensor systems 1514 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1514 further include illumination sources that emit light, such as a flash. In various implementations, the one or more image sensor systems 1514 further include an on-camera image signal processor (ISP) configured to execute a plurality of processing operations on the image data.

In some implementations, sensor data may be obtained by device(s) (e.g., device 105 of FIG. 1) during a scan of a room of a physical environment. The sensor data may include a 3D point cloud and a sequence of 2D images corresponding to captured views of the room during the scan of the room. In some implementations, the sensor data includes image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, IMU, etc.). In some implementations, the sensor data includes visual inertial odometry (VIO) data determined based on image data. The 3D point cloud may provide semantic information about one or more elements of the room. The 3D point cloud may provide information about the positions and appearance of surface portions within the physical environment. In some implementations, the 3D point cloud is obtained over time, e.g., during a scan of the room, and the 3D point cloud may be updated, and updated versions of the 3D point cloud obtained over time. For example, a 3D representation may be obtained (and analyzed/processed) as it is updated/adjusted over time (e.g., as the user scans a room).

In some implementations, sensor data may be positioning information, some implementations include a VIO to determine equivalent odometry information using sequential camera images (e.g., light intensity image data) and motion data (e.g., acquired from the IMU/motion sensor) to estimate the distance traveled. Alternatively, some implementations of the present disclosure may include a simultaneous localization and mapping (SLAM) system (e.g., position sensors). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In some implementations, the device 1500 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 1500 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 1500.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 includes a non-transitory computer readable storage medium.

In some implementations, the memory 1520 or the non-transitory computer readable storage medium of the memory 1520 stores an optional operating system 1530 and one or more instruction set(s) 1540. The operating system 1530 includes procedures for handling various basic system services and for performing hardware dependent tasks. In some implementations, the instruction set(s) 1540 include executable software defined by binary information stored in the form of electrical charge. In some implementations, the instruction set(s) 1540 are software that is executable by the one or more processing units 1502 to carry out one or more of the techniques described herein.

The instruction set(s) 1540 includes an input image instruction set 1542 and an output image conversion instruction set 1544. The instruction set(s) 1540 may be embodied as a single software executable or multiple software executables.

The input image instruction set 1542 is configured with instructions executable by a processor to determine to receive and process a mono input image for conversion to a stereo image pair.

The output image conversion instruction set 1544 is configured with instructions executable by a processor to convert mono image content to a stereo image pair using viewpoint, depth, or boundary adjustment processes in combination with comfort parameter adjustments.

Although the instruction set(s) 1540 are shown as residing on a single device, it should be understood that in other implementations, any combination of the elements may be located in separate computing devices. Moreover, FIG. 15 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at an electronic device having a processor:
        obtaining an input image comprising appearance values at pixel positions, the input image corresponding to an appearance of a scene from a center viewpoint;
        determining a depth image comprising depth values of at least a subset of the pixel positions of the input image;
        generating a left eye image corresponding to a left eye viewpoint of the scene different than the center viewpoint, the left eye image generated by identifying appearance values for a first set of altered pixel positions based on the input image and a first coordinate image that is warped for the left eye viewpoint using the depth image; and
        generating a right eye image corresponding to a right eye viewpoint of the scene different than the center viewpoint and the left eye viewpoint, the right eye image generated by identifying appearance values for a second set of altered pixel positions based on the input image and a second coordinate image that is warped for the right eye viewpoint using the depth image.

2. The method of claim 1, wherein the depth image is generated based on assessing the input image with a neural network.

3. The method of claim 1, further comprising providing the left eye image and the right eye image to form a stereo output image pair depicting the scene for viewing on a stereoscopic display of a head-mounted device (HMD).

4. The method of claim 1, wherein generating the right eye image further comprises:
   identifying appearance values for additional pixel positions in addition to the second set of altered pixel positions based on the second coordinate image and the input image.

5. The method of claim 4, wherein identifying the appearance values for the additional pixel positions comprises:
   identifying an intermediate pixel position between two adjacent pixel positions in the second set of altered pixel positions; and
   identifying an appearance value for the intermediate pixel position by identifying a pixel position in the input image between pixel positions in the input image corresponding to the two adjacent pixel positions according to the coordinate image.

6. A system comprising:
   a processor;
   a computer readable medium storing instructions that when executed by the processor cause the processor to perform operations comprising:
   obtaining an input image comprising appearance values at pixel positions, the input image corresponding to an appearance of a scene from a center viewpoint;
   determining a depth image comprising depth values of at least a subset of the pixel positions of the input image;
   generating a left eye image corresponding to a left eye viewpoint of the scene different than the center viewpoint, the left eye image generated by identifying appearance values for a first set of altered pixel positions based on the input image and a first coordinate image that is warped for the left eye viewpoint using the depth image; and
   generating a right eye image corresponding to a right eye viewpoint of the scene different than the center viewpoint and the left eye viewpoint, the right eye image generated by identifying appearance values for a second set of altered pixel positions based on the input image and a second coordinate image that is warped for the right eye viewpoint using the depth image.

7. The system of claim 6, wherein the depth image is generated based on assessing the input image with a neural network.

8. The system of claim 6, wherein the operations further comprise providing the left eye image and the right eye image to form a stereo output image pair depicting the scene for viewing on a stereoscopic display of a head-mounted device (HMD).

9. The system of claim 6, wherein generating the right eye image further comprises:
   identifying appearance values for additional pixel positions in addition to the second set of altered pixel positions based on the second coordinate image and the input image.

10. The system of claim 9, wherein identifying the appearance values for the additional pixel positions comprises:
    identifying an intermediate pixel position between two adjacent pixel positions in the second set of altered pixel positions; and
    identifying an appearance value for the intermediate pixel position by identifying a pixel position in the input image between pixel positions in the input image corresponding to the two adjacent pixel positions according to the coordinate image.

11. A non-transitory computer-readable medium comprising instructions that when executed by a processor cause the processor to perform operations comprising:
    obtaining an input image comprising appearance values at pixel positions, the input image corresponding to an appearance of a scene from a center viewpoint;
    determining a depth image comprising depth values of at least a subset of the pixel positions of the input image;
    generating a left eye image corresponding to a left eye viewpoint of the scene different than the center viewpoint, the left eye image generated by identifying appearance values for a first set of altered pixel positions based on the input image and a first coordinate image that is warped for the left eye viewpoint using the depth image; and
    generating a right eye image corresponding to a right eye viewpoint of the scene different than the center viewpoint and the left eye viewpoint, the right eye image generated by identifying appearance values for a second set of altered pixel positions based on the input image and a second coordinate image that is warped for the right eye viewpoint using the depth image.

12. The non-transitory computer-readable medium of claim 11, further comprising providing the left eye image and the right eye image to form a stereo output image pair depicting the scene for viewing on a stereoscopic display of a head-mounted device (HMD).

* * * * *